United States Patent
Narayanan et al.

(10) Patent No.: US 8,759,715 B2
(45) Date of Patent: Jun. 24, 2014

(54) METHOD OF AC WELDING WITH CORED ELECTRODE

(75) Inventors: Badri K. Narayanan, Euclid, OH (US); Patrick T. Soltis, Shaker Heights, OH (US); Elliott K. Stava, Sagamore Hills, OH (US); Russell K. Myers, Hudson, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1752 days.

(21) Appl. No.: 10/959,587

(22) Filed: Oct. 6, 2004

(65) Prior Publication Data

US 2006/0070983 A1 Apr. 6, 2006

(51) Int. Cl.
*B23K 9/073* (2006.01)

(52) U.S. Cl.
USPC .................. 219/130.51; 219/137 PS

(58) Field of Classification Search
USPC ............. 219/130.51, 137 PS, 146.31, 146.22, 219/146.24, 130.5
See application file for complete search history.

(56) References Cited

U.S. PATENT DOCUMENTS

| | | | |
|---|---|---|---|
| 1,888,453 A | 11/1932 | De Pape | |
| 1,946,958 A * | 2/1934 | Anastasiadis | 428/385 |
| 2,802,762 A | 8/1957 | Stetson et al. | |
| 3,177,340 A | 4/1965 | Danhier | |
| 3,415,976 A | 12/1968 | Smith | |
| 3,424,892 A | 1/1969 | Wilcox | |
| 3,458,685 A | 7/1969 | Tezuka | |
| 3,461,270 A | 8/1969 | Patton | |
| 3,466,417 A | 9/1969 | Chapman | |
| 3,539,765 A | 11/1970 | Duttera | |
| 3,560,702 A | 2/1971 | Arikawa et al. | |
| 3,566,073 A | 2/1971 | Black | |
| 3,573,426 A | 4/1971 | Blake et al. | |
| 3,585,343 A | 6/1971 | Crichton | |
| 3,596,053 A | 7/1971 | Kameda | |
| 3,627,574 A | 12/1971 | Delong | |
| 3,670,135 A | 6/1972 | Zvanut | |
| 3,702,390 A | 11/1972 | Blake et al. | |
| 3,742,185 A | 6/1973 | Parks | |
| 3,767,891 A | 10/1973 | Haverstraw | |
| 3,769,491 A | 10/1973 | De Long et al. | |

(Continued)

FOREIGN PATENT DOCUMENTS

| EP | 0125925 A2 | 11/1984 |
|---|---|---|
| EP | 0231570 A2 | 8/1987 |

(Continued)

OTHER PUBLICATIONS

Machine translation of Japan Patent doment No. 9-38,772-A, Feb. 2014.*

(Continued)

*Primary Examiner* — Geoffrey S Evans
(74) *Attorney, Agent, or Firm* — Perkins Coie LLP

(57) ABSTRACT

A method of arc welding with a cored electrode comprising creating a positive waveform with a first shape and having a first time; creating a negative waveform with a second shape and having a second time; making one of the first and second shapes greater in magnitude than the other of the shapes; and, adjusting the percentage relationship of the first and second times so the time of the shape with the greater magnitude is substantially less than the time of the other shape.

103 Claims, 28 Drawing Sheets

(56) References Cited

U.S. PATENT DOCUMENTS

| | | | |
|---|---|---|---|
| 3,778,588 A | 12/1973 | Bishel | |
| 3,778,589 A | 12/1973 | Nakabayashi | |
| 3,786,658 A | 1/1974 | Swaim | |
| 3,787,658 A | 1/1974 | Kammer et al. | |
| 3,866,015 A | 2/1975 | Matsumoto | |
| 3,883,713 A | 5/1975 | Gurevich | |
| 3,911,244 A | 10/1975 | Nakamura | |
| 4,010,309 A | 3/1977 | Petersen | |
| 4,020,320 A | 4/1977 | Pijls | |
| 4,072,845 A | 2/1978 | Buckingham | |
| 4,092,517 A * | 5/1978 | Woodacre | 219/137 PS |
| 4,122,238 A | 10/1978 | Frantzerb | |
| 4,131,784 A | 12/1978 | Kimura et al. | |
| 4,149,063 A | 4/1979 | Bishel | |
| 4,154,999 A | 5/1979 | Pinfold et al. | |
| 4,186,293 A | 1/1980 | Gonzalez | |
| 4,207,454 A | 6/1980 | Safonnikov et al. | |
| 4,246,463 A | 1/1981 | Shutt et al. | |
| 4,314,136 A | 2/1982 | Kotecki | |
| 4,319,124 A | 3/1982 | Johansson | |
| 4,355,224 A | 10/1982 | Mesick et al. | |
| 4,366,364 A | 12/1982 | Arai | |
| 4,376,881 A | 3/1983 | Safonnikov et al. | |
| 4,427,874 A | 1/1984 | Tabata et al. | |
| 4,449,031 A | 5/1984 | Kotecki | |
| 4,454,406 A | 6/1984 | Safonnikov et al. | |
| 4,465,921 A | 8/1984 | Sakai | |
| 4,510,374 A | 4/1985 | Kobayashi | |
| 4,512,822 A | 4/1985 | Barringer et al. | |
| 4,551,610 A | 11/1985 | Amata | |
| 4,557,768 A | 12/1985 | Barringer et al. | |
| 4,571,480 A | 2/1986 | Sakai | |
| 4,683,011 A | 7/1987 | Weaver et al. | |
| 4,689,461 A | 8/1987 | Gamberg | |
| 4,717,536 A | 1/1988 | Chai et al. | |
| 4,717,807 A | 1/1988 | Parks et al. | |
| 4,723,061 A | 2/1988 | Munz et al. | |
| 4,794,232 A | 12/1988 | Kimbrough et al. | |
| 4,800,131 A | 1/1989 | Marshall | |
| 4,803,340 A | 2/1989 | Sato | |
| 4,833,296 A | 5/1989 | Crockett et al. | |
| 4,866,247 A | 9/1989 | Parks | |
| 4,889,969 A | 12/1989 | Kawai | |
| 4,948,936 A | 8/1990 | Landry | |
| 4,954,691 A | 9/1990 | Parks et al. | |
| 4,999,479 A | 3/1991 | Paton | |
| 5,003,155 A | 3/1991 | Chai et al. | |
| 5,015,823 A | 5/1991 | Crockett et al. | |
| 5,055,655 A | 10/1991 | Chai et al. | |
| 5,091,628 A | 2/1992 | Chai et al. | |
| 5,120,931 A | 6/1992 | Kotecki et al. | |
| 5,124,529 A | 6/1992 | Nishikawa | |
| 5,124,530 A | 6/1992 | O'Donnell | |
| 5,132,514 A | 7/1992 | Chai et al. | |
| 5,220,151 A | 6/1993 | Terayama et al. | |
| 5,220,551 A | 6/1993 | Tateishi et al. | |
| 5,225,660 A * | 7/1993 | Mita et al. | 219/130.51 |
| 5,225,661 A | 7/1993 | Chai | |
| 5,233,160 A | 8/1993 | Gordish | |
| 5,278,390 A | 1/1994 | Blankenship | |
| 5,304,346 A | 4/1994 | O'Donnell | |
| 5,308,698 A | 5/1994 | Bishel | |
| 5,349,159 A | 9/1994 | Mita et al. | |
| 5,365,036 A | 11/1994 | Crockett et al. | |
| 5,369,244 A | 11/1994 | Kulikowski et al. | |
| 5,676,857 A | 10/1997 | Parker | |
| 5,742,029 A | 4/1998 | Stava et al. | |
| 5,861,605 A | 1/1999 | Ogawa | |
| 5,914,061 A | 6/1999 | Ogawa | |
| 5,961,863 A | 10/1999 | Stava | |
| 5,981,906 A | 11/1999 | Parker | |
| 5,990,445 A | 11/1999 | Ogasawara et al. | |
| 6,051,810 A | 4/2000 | Stava | |
| 6,075,224 A * | 6/2000 | De Coster | 219/130.5 |
| 6,087,628 A * | 7/2000 | Ferkel et al. | 219/130.5 |
| 6,091,048 A | 7/2000 | Lanouette et al. | |
| 6,093,906 A | 7/2000 | Nicholson et al. | |
| 6,111,216 A | 8/2000 | Stava | |
| 6,114,656 A | 9/2000 | Fairchild | |
| 6,124,569 A | 9/2000 | Bonnet | |
| 6,160,241 A | 12/2000 | Stava et al. | |
| 6,172,333 B1 | 1/2001 | Stava | |
| 6,204,478 B1 | 3/2001 | Nicholson et al. | |
| 6,207,929 B1 | 3/2001 | Stava | |
| 6,215,100 B1 | 4/2001 | Stava | |
| 6,291,798 B1 | 9/2001 | Stava | |
| 6,300,596 B1 | 10/2001 | Bonnet | |
| 6,337,144 B1 | 1/2002 | Shimizu | |
| 6,339,209 B1 | 1/2002 | Kotecki | |
| 6,340,396 B1 | 1/2002 | Ogawa | |
| 6,365,874 B1 * | 4/2002 | Stava | 219/130.51 |
| 6,441,334 B1 | 8/2002 | Aida | |
| 6,472,634 B1 | 10/2002 | Houston | |
| 6,501,049 B2 | 12/2002 | Stava | |
| 6,515,259 B1 | 2/2003 | Hsu et al. | |
| 6,521,867 B2 | 2/2003 | Bonnet | |
| 6,573,476 B2 | 6/2003 | Kim | |
| 6,617,549 B2 | 9/2003 | Ihde | |
| 6,649,872 B2 | 11/2003 | Kato | |
| 6,713,723 B2 | 3/2004 | Lee | |
| 6,717,107 B1 | 4/2004 | Hsu | |
| 6,723,954 B2 | 4/2004 | Nikodym et al. | |
| 6,723,957 B2 | 4/2004 | Holverson | |
| 6,784,401 B2 * | 8/2004 | North et al. | 219/146.31 |
| 6,841,246 B2 | 1/2005 | Shimizu | |
| 6,855,913 B2 | 2/2005 | Nikodym | |
| 7,053,334 B2 | 5/2006 | Stava | |
| 7,064,290 B2 | 6/2006 | Blankenship et al. | |
| 7,145,101 B2 | 12/2006 | Tong | |
| 7,166,817 B2 | 1/2007 | Stava | |
| 7,271,365 B2 | 9/2007 | Stava et al. | |
| 2001/0023863 A1 | 9/2001 | Bonnet | |
| 2002/0030043 A1 | 3/2002 | Tong | |
| 2002/0037420 A1 | 3/2002 | Shimizu | |
| 2002/0043307 A1 | 4/2002 | Ishida | |
| 2002/0060212 A1 | 5/2002 | Kim | |
| 2003/0094444 A1 | 5/2003 | Kato | |
| 2003/0116234 A1 | 6/2003 | Santella | |
| 2003/0116548 A1 | 6/2003 | Blankenship | |
| 2003/0116550 A1 | 6/2003 | Lee | |
| 2003/0183609 A1 * | 10/2003 | Holverson et al. | 219/137 PS |
| 2004/0020912 A1 | 2/2004 | Hara | |
| 2004/0187961 A1 | 9/2004 | Crockett | |
| 2004/0188407 A1 | 9/2004 | Nikodym et al. | |
| 2004/0256370 A1 | 12/2004 | Keegan | |
| 2005/0051524 A1 | 3/2005 | Blankenship et al. | |
| 2005/0127054 A1 | 6/2005 | Houston et al. | |
| 2006/0070983 A1 | 4/2006 | Narayanan et al. | |
| 2006/0219684 A1 | 10/2006 | Katiyar | |
| 2006/0226131 A1 | 10/2006 | Stava et al. | |
| 2006/0283848 A1 | 12/2006 | Karogal et al. | |
| 2007/0095807 A1 | 5/2007 | Myers | |

FOREIGN PATENT DOCUMENTS

| | | |
|---|---|---|
| EP | 774317 | 5/1997 |
| EP | 1 004 389 A1 | 5/2000 |
| EP | 1 036 637 A2 | 9/2000 |
| EP | 1 595 634 A1 | 11/2005 |
| FR | 2177134 | 11/1973 |
| GB | 1297865 A | 11/1972 |
| GB | 1397685 A | 6/1975 |
| GB | 2020591 A | 11/1979 |
| GB | 2155045 A | 9/1985 |
| JP | 53-67657 A | 6/1978 |
| JP | 6-023547 | 2/1985 |
| JP | 05228691 A | 9/1993 |
| JP | 05237693 A | 9/1993 |
| JP | 9-38772 | 2/1997 |
| JP | 2000126893 A | 5/2000 |
| JP | 2000288730 | 10/2000 |
| JP | 2000301382 A | 10/2000 |

(56) References Cited

FOREIGN PATENT DOCUMENTS

| RU | 2 217 275 C2 | 11/2003 |
|---|---|---|
| SU | 1780979 A1 | 12/1992 |
| SU | 1826 338 | 8/1996 |

OTHER PUBLICATIONS

European Search Report, EP 05 00 8534, Munich, Jan. 30, 2006, Cauber, J-S.

Japanese Office Action in Japanese Application No. 2005-32411, Dec. 4, 2008.

Tom De Backer, European Search Report, EP 06 11 7981, Munich, Aug. 29, 2007.

Russian Office Action, 2006138266/(041676), 30 Oct. 2006.

SU 1826338 and partial translation.

Taiwan Office Action, May 2008.

Taiwan Office Action, Dec. 14, 2007.

European (EP) Application No. 05008534.9; Examiner's Report dated May 3, 2011 with an English translation.

Japanese (JP) Application No. 2005-144934; Final Rejection dated Mar. 8, 2011 with an English Translation.

* cited by examiner

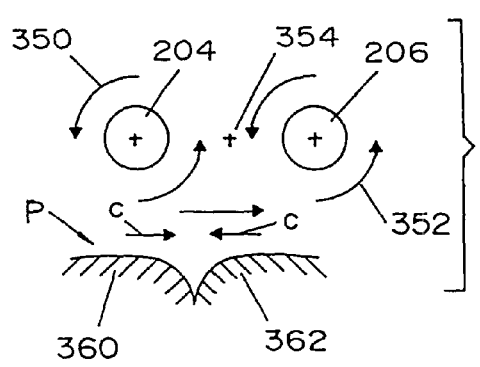
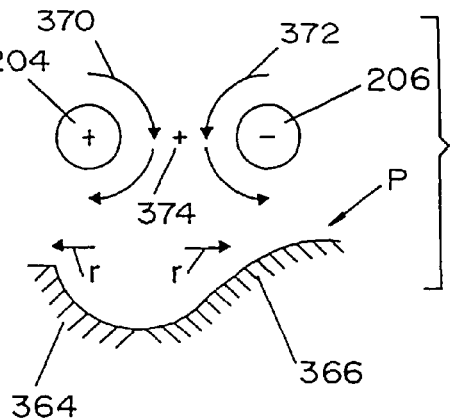
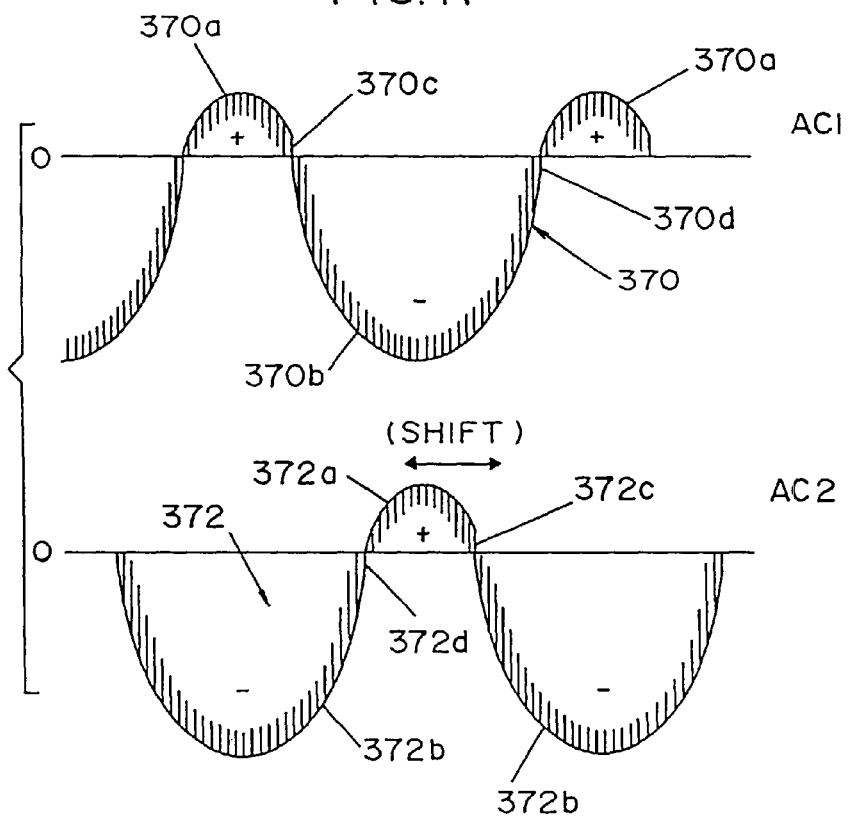

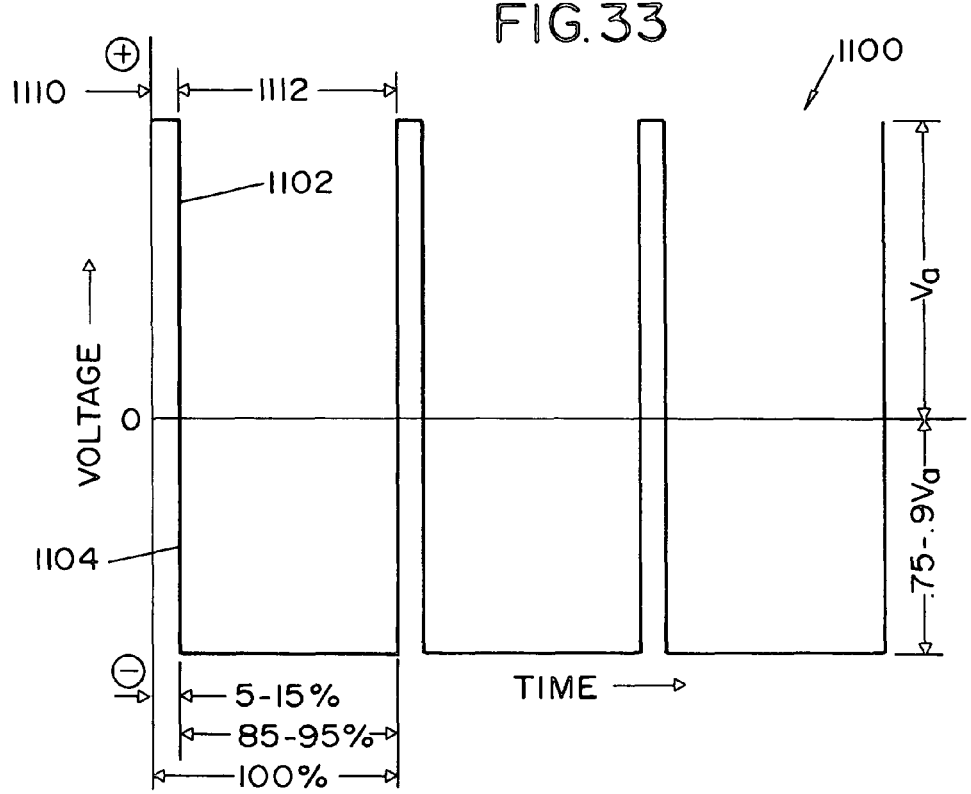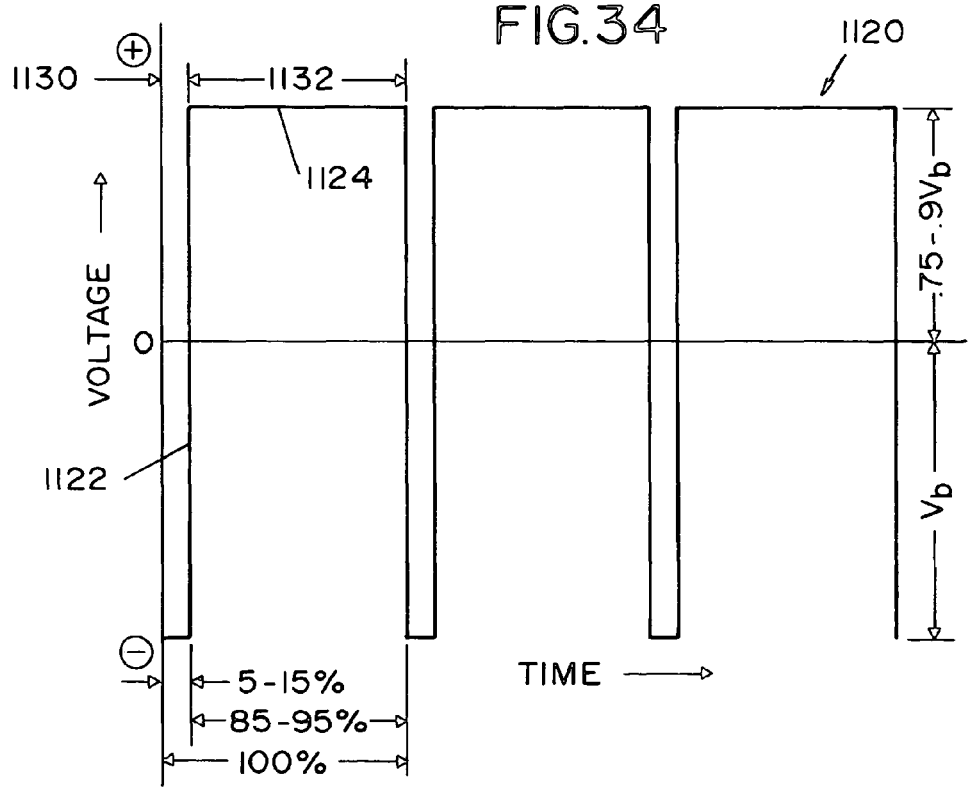

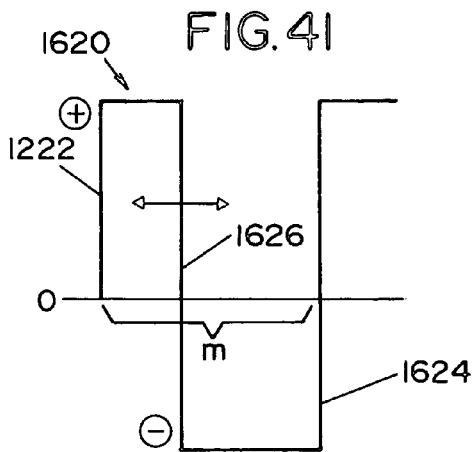
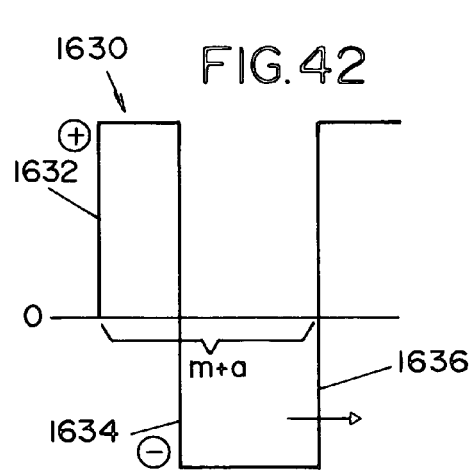
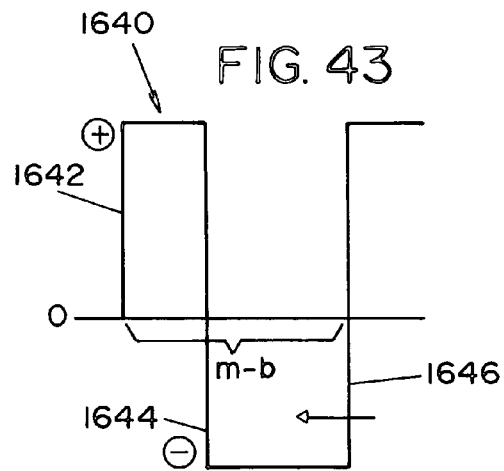
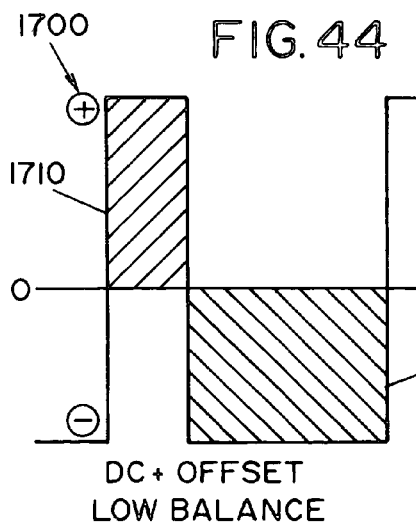
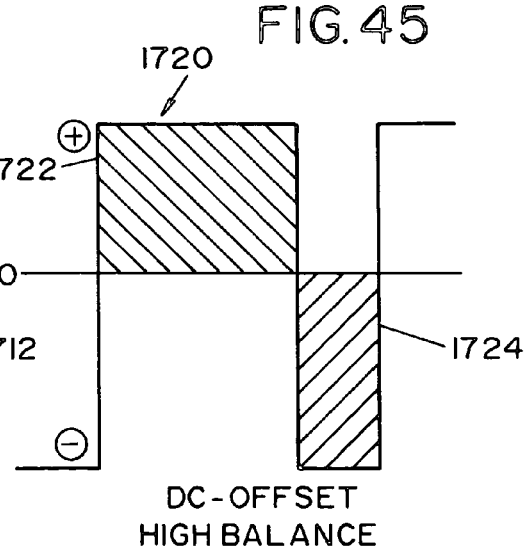

METHOD OF AC WELDING WITH CORED ELECTRODE

The present invention relates to the art of electric arc welding and more particularly to a method of AC welding developed especially for cored electrodes and a welder for performing the novel method.

BACKGROUND OF INVENTION

The invention relates to an inverter based power source which has a waveform generator or wave shaper controlling a pulse width modulator for generating the shape of various portions in an AC welding cycle. A unique control system for this type of welder and method is shown in Houston U.S. Pat. No. 6,472,634. This patent is incorporated by reference herein. The individual AC waveforms obtained by using the control system and welder disclosed in Houston U.S. Pat. No. 6,472,634 constitute unique technology where a number of current pulses occur at a frequency of at least 18 kHz, with a magnitude of each current pulse controlled by the wave shaper or waveform generator. Such waveform technology dates back to Blankenship U.S. Pat. No. 5,278,930, which discloses the shaping of the waveform in an AC welding method. This early creation of AC waveforms for electric arc welding was primarily used for solid welding wires. There has been suggestion that an AC waveform obtained by an inverter using a waveform generator or wave shaper could be adapted for use with cored electrodes. By specially constructing the AC waveform, the waveform can be coordinated with a specific cored electrode so the sheath and core burn back at a desired rate. In this manner, it has been found that AC welding can be used successfully for cored electrodes. In the past, normally DC welding was used for cored electrodes. By creating a specific profile for an AC waveform, the overall welding process is tailor made for use with a cored electrode; however, this type of coordination of the AC waveforms with a cored electrode required very accurate waveform creation. This objective has been obtained only by using waveform technology of the type pioneered by The Lincoln Electric Company of Cleveland, Ohio. By accurately controlling the AC waveform used with the cored electrode, characteristics of the welding process, such as penetration into the base metal, melt off rate of the electrode, the heat input to the base metal, and the welding travel time, as well as the wire feed speed, is optimized. The creation of accurately controlled AC waveforms for use with specific cored electrodes is not a prior art concept, but is the general background to which the present invention is directed.

THE INVENTION

Waveform technology as pioneered by The Lincoln Electric Company of Cleveland, Ohio has been developed for use in AC welding with cored electrodes. Cored electrodes allow the welding operation to be more precisely controlled with the alloy of the weld bead being tailored to the desired mechanical characteristics for the bead and with the position of the welding operation being less limited. However, to provide arc stability and appropriate melting temperatures and rates, the actual control of the waveform for the AC process is quite complicated. Contamination of the weld metal during arc welding is still a problem using AC welding for cored electrodes. Contaminants, like nitrogen in the weld metal after the welding operation can cause porosity, cracking and other types of defects in the weld metal. Consequently, a major challenge confronting designers of arc welding processes has been defined techniques for excluding elements, such as nitrogen, from the arc environment or for neutralizing the potentially harmful effects of such impurities. The potential source of contamination, includes the materials that make up the welding electrode, impurities in the workpiece itself and ambient atmosphere. As is known, a flux cored electrode consists of a tubular metal sheath enclosing a granular fill. This fill includes fluxing or slag agents, as well as alloying ingredients. Some of the ingredients are designed to decompose to generate gases to assist in shielding the weld metal from the atmosphere. Cored electrodes contain "killing" agents, such as aluminum, magnesium, zirconium and titanium which agents combine chemically with potential contaminates to prevent them from forming porosity and harmful inclusion in the weld metal. The present invention involves the use of a unique, novel AC welding method that reduces the tendency of a cored electrode to allow inclusion of contaminants, primarily nitrogen in the weld metal. The method also reduces the amount required as a "killing" agent, especially aluminum.

The invention reduces the exposure of the arc and molten metal to the surrounding atmosphere by modifying the arc current or arc voltage to reduce the overall arc length. The reduction of the arc length reduces the time of exposure during molten metal transfer across the arc and also reduces the temperature of the metal while it is in its molten state. In the past, welding with flux cored electrodes usually employed direct current and generally a negative DC current. However, newly developed welding power sources, such as described above, have made it possible to weld with certain flux cored electrodes using an AC current. Such power sources allow adjustment of the parameters of the positive and negative sections of the AC waveform independently of each other. Thus, the invention is to obtain better welding results when using a flux cored electrode by employing unique control of the AC power source used to weld with the cored electrode.

The invention utilizes the ability to control the actual shape of the negative and positive sections of an AC waveform for use with a cored electrode. The development of a power source based upon an inverter with a waveform generator or wave shaper has resulted in a power source capable of changing the wave balance of an AC waveform. Wave balance is the percentage relationship between the time a weld cycle is positive to the total time of the cycle. These power sources can also change the DC offset. DC offset is the difference in magnitude between the positive section of the waveform and the negative section of the waveform and is usually referred to as a number, such as 20. A −20 offset indicates that the negative section of the waveform is greater. The positive section is 20% less than the negative section. In a like manner, a +20 offset indicates that the positive section of the waveform is greater. The negative section is 20% less than the magnitude of the positive section. This offset can be for either voltage or current of a AC waveform. A Power Wave power source sold by The Lincoln Electric Company of Cleveland, Ohio has the capability of adjusting both the wave balance and the DC offset. This feature is used in the present invention to control the mode of operation of the AC welding process when used to obtain the advantages of a flux cored electrode, which advantage are well known in the welding industry.

The present invention involves the operation of an AC welder for use with a cored electrode using relationships between wave balance and DC offset to reduce the effective arc length of the welding process thereby reducing the propensity for contamination of the weld metal. It has been found that with a positive offset where the negative voltage is not sufficient to maintain arc stability, the welding process can be performed by periodic high positive voltage spikes resulting from a low wave balance. In other words, by having a +DC offset, the voltage in the negative section of the waveform can be lower than the voltage necessary if it were to be welded with DC to maintain arc stability. The use of a small positive section during each AC waveform imparts stability to the arc during the welding process. Thus, the voltage RMS of the waveform is low and the arc length is also low. This mode of welding with a +DC offset and a low wave balance maintains a low recovery of nitrogen in the weld metal. This mode is used up to a given balance, such as about 35-40%. Consequently, a first mode of operation using the invention is a +DC offset with a low wave balance. This mode is the preferred operation of the present invention. It has also been found that by using a −DC offset with the magnitude of the negative section greater than the magnitude of the positive section of the AC waveform, the nitrogen recovery is reduced as the wave balance increases. This fact is used to change the mode of welding after the reduction in nitrogen recovery by the +DC offset waveform is less than an increased nitrogen recovery caused by an increased wave balance with the −DC offset. Thus, the invention involves controlling DC offset and the wave balance in a manner to maintain a low contamination of the weld metal. This is possible by using a +DC offset at low wave balance and a −DC offset at high wave balance. The control of these two parameters of the AC waveform is used to reduce the voltage RMS of the waveform to a level sufficiently low to minimize the arc length of the welding process.

It has been found that the DC offset and wave balance of the AC waveform can be manipulated to control the level of nitrogen in the weld metal. This type manipulation is also possible to reduce and control the level of oxygen and hydrogen in the weld metal. By reducing the overall levels of contamination there is a lesser need for a "killing" agent, such as aluminum, in the core of the electrode. This lesser need allows the electrode designer to concentrate on optimizing the alloy agent levels in the electrode to achieve optimum physical properties in the weld metal.

To minimize the atmospheric contamination of the weld metal during the arc welding process with a flux cored electrode, the AC waveform is adjusted by coordinating the wave balance and related DC offset to minimize the average arc length consistent with the need for arc stability and smooth transfer of metal from the electrode to the weld puddle. Arc length is a function of arc voltage, although the relationship may or may not be linear, higher voltages do give longer arcs and vice versa. Consequently, the manipulation of wave balance and DC offset for AC welding using a cored electrode allows a reduced arc length. This unique control of the waveform is an improvement over common DC welding wherein a higher voltage is required to maintain stable arc. The lower limit of usable arc length requires a higher voltage at the tip of the electrode. By using the invention, an AC waveform is usable for cored electrode and the arc length is reduced. Arc stability is thereby obtained even though there is a shorter arc length. The invention sets three parameters to accomplish the objective. The voltage RMS during the positive portion of the AC waveform, the voltage RMS during the negative portion of the AC waveform and the wave balance are these parameters. The RMS of the two sections of the waveforms are maintained at a low level determined by adjustment of wave balance. With a +DC offset, the RMS of the waveform increases as the wave balance increases. In an opposite manner, for a −DC offset, the RMS decreases as the wave balance increases. Thus, at lower wave balances, a +DC offset is used. At higher wave balances, a −DC offset is employed. In either manner, the objective is to control the RMS to reduce the arc length and the amount of contaminate exposure by the molten metal during the welding process.

Setting of the shorter overall arc length by the present invention is thus reflective of two novel welding modes. A short duty cycle or low wave balance, with higher voltage in the positive section or a longer duty cycle or high wave balance with a higher voltage in the negative section. Thus, the invention involves low voltage for the majority of the AC cycle time resulting in a short average arc length, while a short pulse of higher voltage in the opposite direction maintains arc stability. Such results are obtained by employing the present invention. The optimum waveform settings are selected by using the constraints of the present invention. Thus, lower arc lengths and reduced contamination of the weld metal can be realized. However, the actual waveform shapes for different electrodes will be different. Materials with different ionization characteristics in the electrode core may alter the arc stability in either the positive or negative polarity. Appropriate choices of ionizing species, combined with the inventive settings of the waveform offset and wave balance as dictated by the present invention, are used to optimize different aspects of the electrode performance, for instance, weld shape, penetration, and physical properties. The present invention accomplishes this result when using AC welding for cored electrodes of the type including a slag system, or flux system combined with alloying agents. For reasons known in the art, the amount of killing agent, especially aluminum, required in the weld process will be decreased. This reduction is to a level lower than 10% in the fill and preferably to a level lower than 5% in the fill or substantially no aluminum. The use of the present invention results in a low contamination in the weld metal, and, thus, reduces the need for killing agents, such as aluminum.

In accordance with the present invention there is provided a method of arc welding with a cored electrode. The method includes creating a positive waveform with a first shape and a first time, creating a negative waveform with a second shape and a second time, making one of the first and second shapes greater in magnitude than the other of the shapes and adjusting the percentage relationship of the first and second time to obtain a voltage RMS less than a given level. The given level for the voltage RMS is above a selected arc stability level for the welding process.

Aluminum is often used in the core of the electrode to reduce the amount of nitrogen in the weld metal. Indeed, normally 5-20% of the core fill is aluminum. However, aluminum in the weld metal slows down diffusional transformations and promotes shear transformations. In particular, it has always been difficult to arrive at a acicular ferrite microstructures in FCAW-S electrodes, since the addition of aluminum causes the formation of lath bainite. Thus, formation of fine-grain microstructure is inherently difficult in aluminum containing weld metal. It is desirable to lower or eliminate the level of aluminum in the weld metal so a finer as-welded microstructure is obtained, which improves the toughness of the weld metal. By using the present invention, the aluminum can be reduced below 5% and in some electrodes below 2% or substantially zero aluminum in the core fill. This is a substantial improvement in welding with cored electrodes. In the preferred embodiment of the invention, the positive shape of the AC waveform is greater in magnitude than the negative shape. In this +DC offset mode, the wave balance is less than 50% and preferably less than about 35%. However, the wave balance is greater than 5% so the welding operation has a low basic negative voltage with intermittent high positive voltage spikes. These short pulses provide the advantages of a low DC− welding operation while maintaining the stability of the welding operation. Consequently, low RMS with high positive spikes keep the arc stable, even though the actual voltage or current for welding is not sufficient for arc stability. When the DC offset is negative, a higher magnitude for the negative voltage or current is used in the AC waveform. When this offset is used, the percentage relationship for the wave balance is greater than a value, such as 30%. In both instances, there is a substantial voltage at a low level and a spike voltage at a high level. This reduces the RMS and arc length, but maintains stability.

In the broad sense, the invention provides a method of arc welding with a cored electrode. The method involves creating a positive waveform with a first shape having a first time and a negative waveform with a second shape having a second time. One of the waveforms has a greater magnitude than the other waveform, with the percentage relationship of the first and second times being adjusted so that the time of the shape with the greater magnitude is substantially less than the time of the other shape. The voltage RMS of the positive and negative waveforms is above a set arc stability level. This voltage RMS is adjusted by changing the wave balance of the AC cycle involving the positive and negative waveforms. The positive and negative waveforms combine to form an AC cycle. This relationship is often referred to as an AC waveform with positive and negative sections. The two presentations are the same concept.

In accordance with an aspect of the invention, the greater time for one section of the waveform is at least twice the time for the other section. Indeed, the greater time is at least eight times the other section time. The waveform with the lesser magnitude is about 0.7-0.9 times the magnitude of the other waveform or shape having the greater magnitude. In this manner, a low voltage RMS is obtained by a low voltage or current during a major portion of the waveform, while a high voltage or current spike is used to maintain arc stability. The small high voltage or high current portion is about 5-15% wave balance. The offset is such that the low current or voltage is approximately 0.70-0.90 times the magnitude of the high voltage or high current. With these offsets and using a small spike portion, low voltage RMS is maintained with arc stability. Contaminations in the weld metal are reduced.

In accordance with another aspect of the present invention there is provided an electric arc welder comprising an inverter with a waveform generator. The generator has a first input to create a positive waveform or section with a first shape and having a first time and a second input creating a negative waveform or section with a second shape and a second time. One of the first and second shapes is greater in magnitude than the other of the shapes and a circuit is provided to adjust the percentage relationship of the first and second times to obtain a voltage RMS less than a given level, which given level is above a set arc stability level. With one magnitude exceeding the other magnitude and having only a small portion of the total time, a low voltage RMS is obtained with a spike in the opposite direction to maintain arc stability.

The AC waveforms are created at a known frequency. This frequency is in the general range of 30-120 Hz, and preferably about 50-60 Hz.

The primary object of the present invention is the provision of a method of using AC welding with a cored electrode, which method has a reduced voltage RMS to reduce the arc length and, thus, the mechanical physical features causing weld metal contamination.

Yet another object of the present invention is the provision of a method, as defined above, which method involves an AC waveform with a relatively long low magnitude portion and a relative short high magnitude portion. The high magnitude portion is generally 5-15% of the total waveform cycle.

Another object of the present invention is the provision of a method, as defined above, which method allows reduction in the use of aluminum in the core, which reduction is to a level less than 10% and preferably near substantially no aluminum in the core. In this manner, the grain size of the weld metal is improved.

Yet another object of the present invention is the provision of an electric arc welder comprising an inverter with a waveform generator. The waveform generator has a first input to create a positive waveform or section with a first shape and having a first time and a second input to create a negative waveform or section with a second shape and the second time where one of the first and second shapes is greater in magnitude than the other shape. This ability to profile the individual portions of a single waveform to adjust the relative magnitude is a capability of a waveform technology type power source, such as manufactured by The Lincoln Electric Company of Cleveland, Ohio. This welder also has the capability of adjusting the percentage relationship of the first and second times to obtain a low RMS with short spikes of voltage or current to maintain arc stability. The frequency is preferably in the general range of 30-120 Hz.

A broad object of the present invention is the provision of an AC welder and method of using an AC welder, which welder and method uses a cored electrode for the AC welding process and has a reduced arc length causing less contamination.

Still a further object of the invention is provision of a novel slag system used in the cored electrode, which slag system lowers or eliminates the level of aluminum in the weld metal so a finer microstruture is obtained which improves the toughness of the weld metal. The slag system oxidizes aluminum or substitutes magnesium, silicon, zirconium or titanium for aluminum. Thus, the use of the slag system assists in the elimination of aluminum, as a de-oxidizer so that sodium arc stabilizes can be used in the cored electrode.

These and other objects and advantages will become apparent from the following description taken together with the accompanying drawings.

BRIEF DESCRIPTION OF DRAWINGS

FIGS. 9 and 10 are schematic drawings illustrating the dynamics of the weld puddle during concurrent polarity relationships of tandem electrodes;

FIG. 11 is a pair of current graphs showing the waveforms on two adjacent tandem electrodes that can be generated by an inverter forming the background of the invention;

FIG. 33 is a graph of voltage showing the preferred embodiment of the invention when in the +DC offset mode;

FIG. 34 is a graph, similar to the graph in FIG. 33, showing the preferred embodiment of the invention in the −DC offset mode;

FIGS. 41-43 are graphs showing waveform balancing concepts;

FIG. 44 is a graph illustrating the preferred operation of the invention when in the +DC offset mode; and, FIG. 45 is a view, similar to the graph of FIG. 44, showing a preferred operation of the invention in the −DC offset mode of operation.

PREFERRED EMBODIMENT

Figure 15:
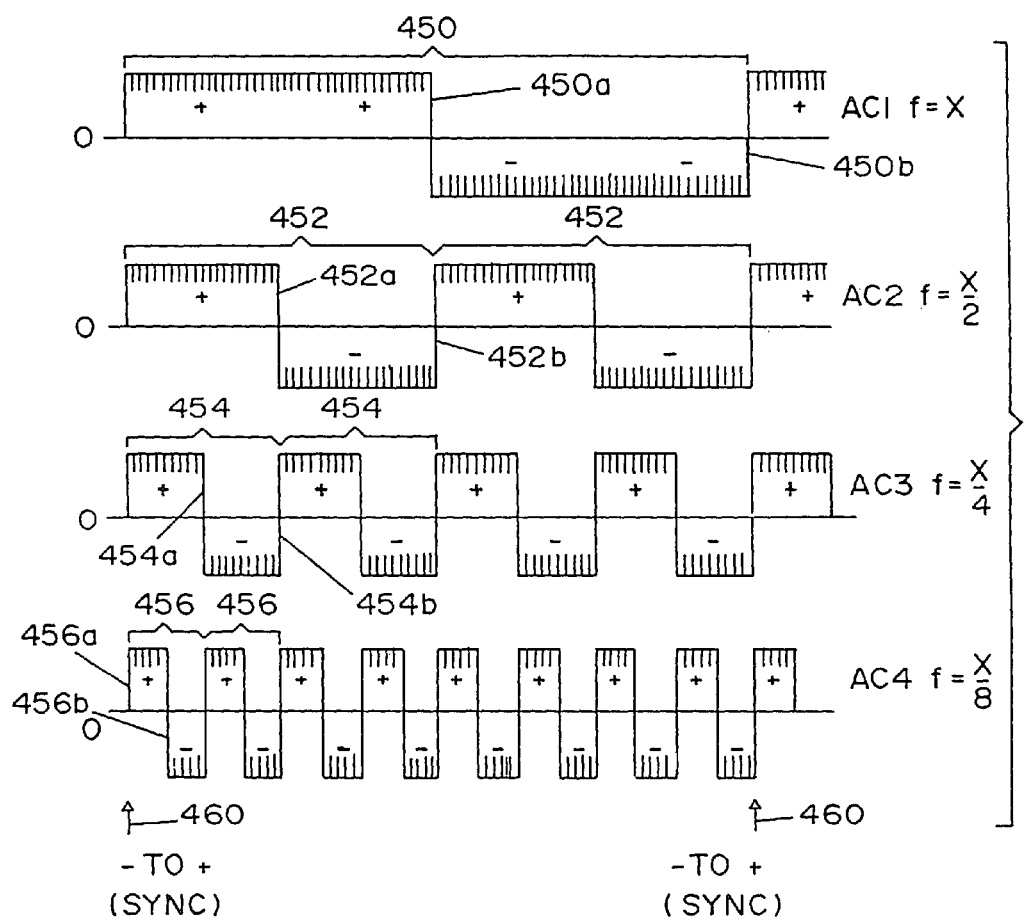
FIG. 15 are current graphs showing waveforms at four adjacent AC arcs of tandem electrodes shaped and synchronized in accordance with a background aspect of the invention.
Figure 16:
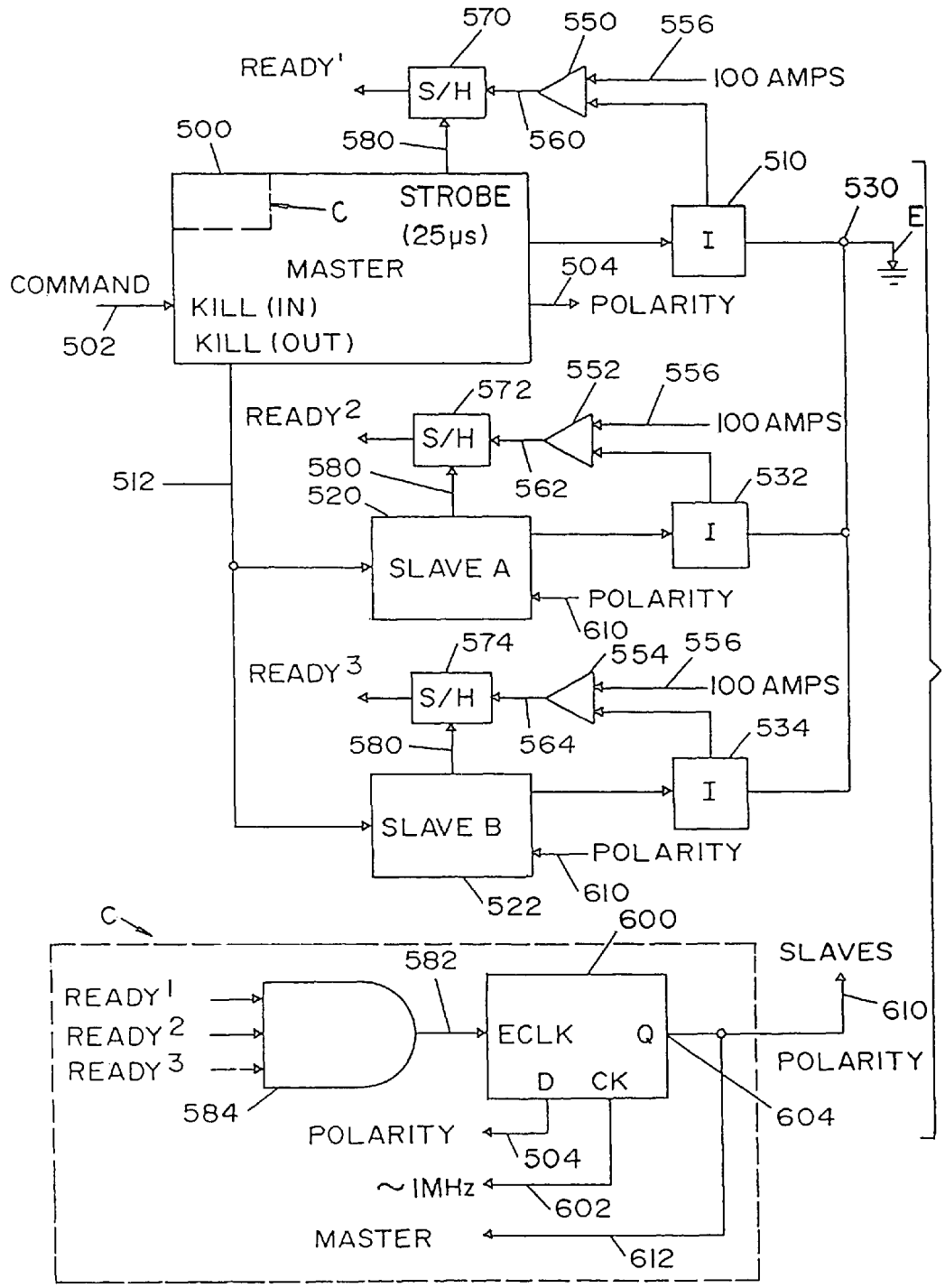
FIG. 16 is a schematic layout of a known software program to cause switching of the paralleled power supplies as soon as the coordinated switch commands have been processed and the next coincident signal has been created.
Figure 17:
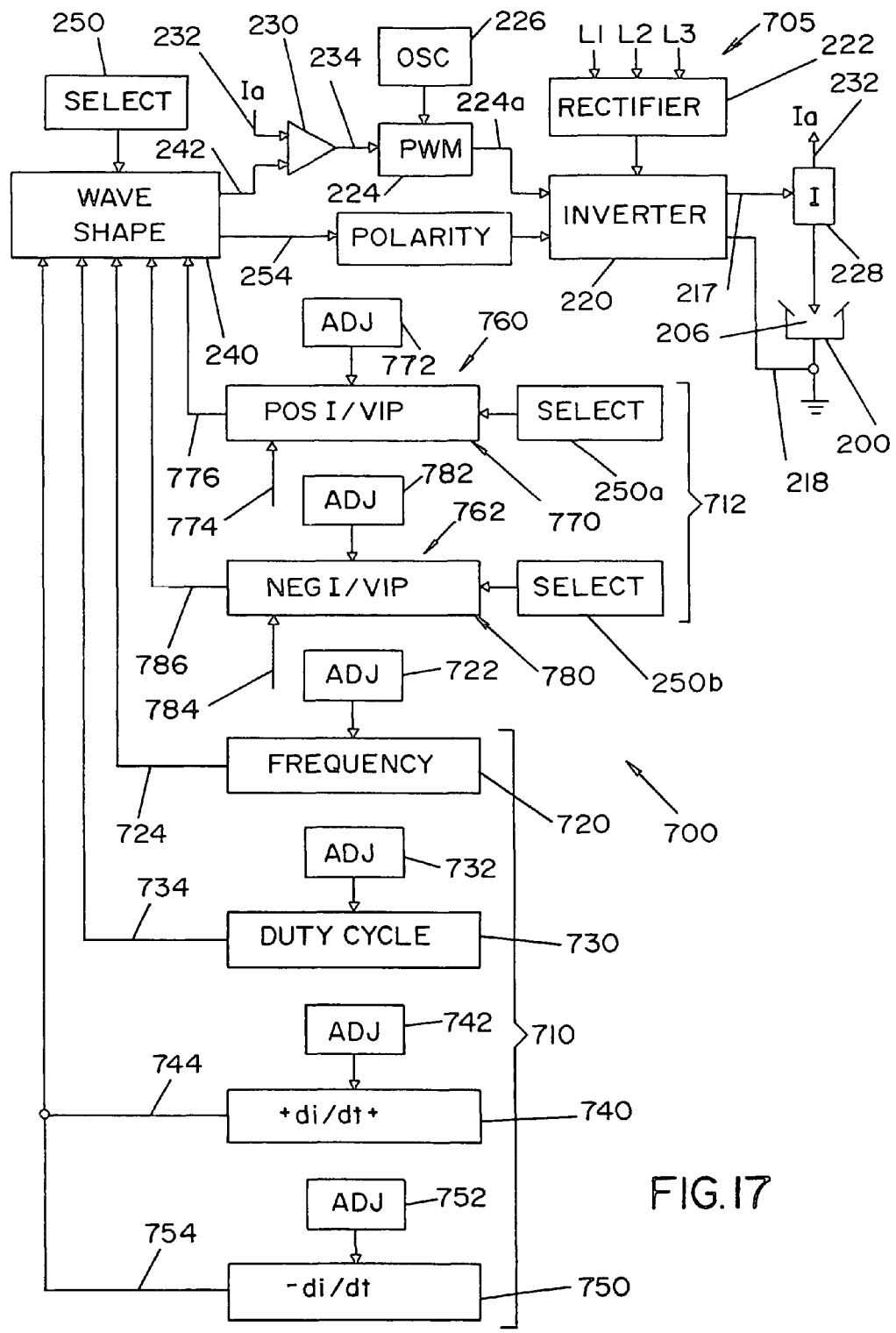
FIG. 17 is a block diagram of the program used in the computerized controller of the welder to control the actual profile of the waveform using the system shown in FIGS. 1-16, so a welder can perform an AC welding operation using a waveform tailored to a given cored electrode in accordance with a program as represented in FIGS. 21 AND 27.
Figure 18:
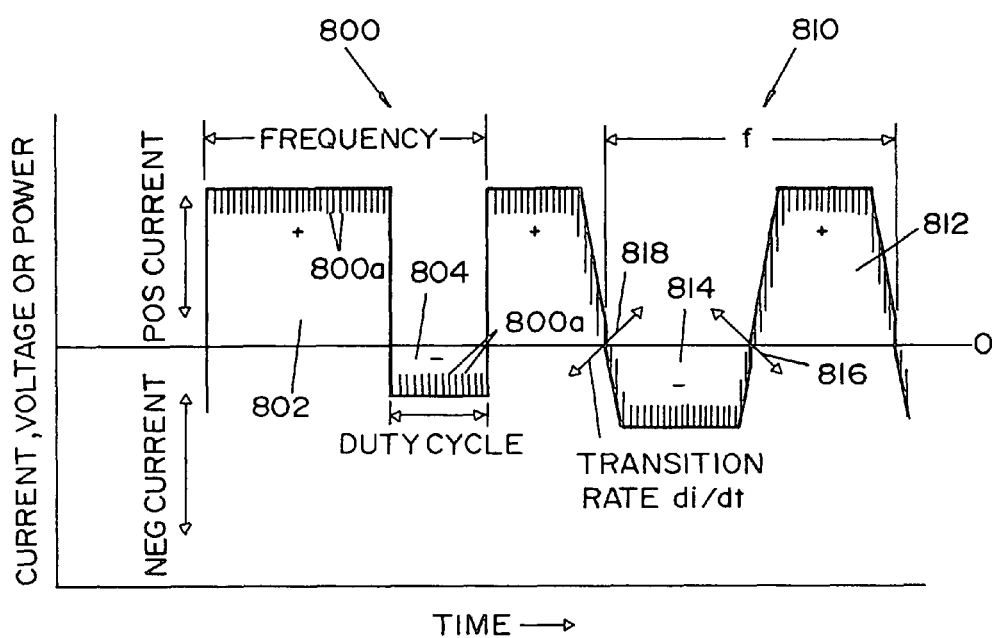
FIG. 18 is a schematically illustrated tailored AC waveform used for a given cored electrode by the program shown in FIG. 17.

Referring now to the drawings wherein the showings are for the purpose of illustrating a preferred embodiment of the invention only and not for the purpose of limiting same, a background system for implementing the invention is shown in detail in FIGS. 1, 2, 4, 5 and 16. FIGS. 2 and 6-15 describe attributes and features of the disclosed background welding systems. The welder described in FIGS. 17 and 18 is used to construct the precise profile of the AC waveforms using a wave shaper or waveform generator so the profile is tailored to a specific electrode represented in FIG. 20. These electrode determined profiles are used in practicing the welding method forming the background system in a manner described in FIGS. 19-27. In summary, FIGS. 1-16 disclose prior systems to provide AC waveforms using waveform technology developed by The Lincoln Electric Company of Cleveland, Ohio. FIGS. 17-27 teach how to use this known technology to tailor an AC waveform to a given cored electrode. This information is background to the invention disclosed in FIGS. 28-45 where the ability to tailor the shape of the AC waveform is employed in a novel welding method having two distinct modes and used to reduce weld metal contamination by reducing the RMS or arc length $L_A$.

General Disclosure of Waveform Technology

FIGS. 1-16

Figure 1:
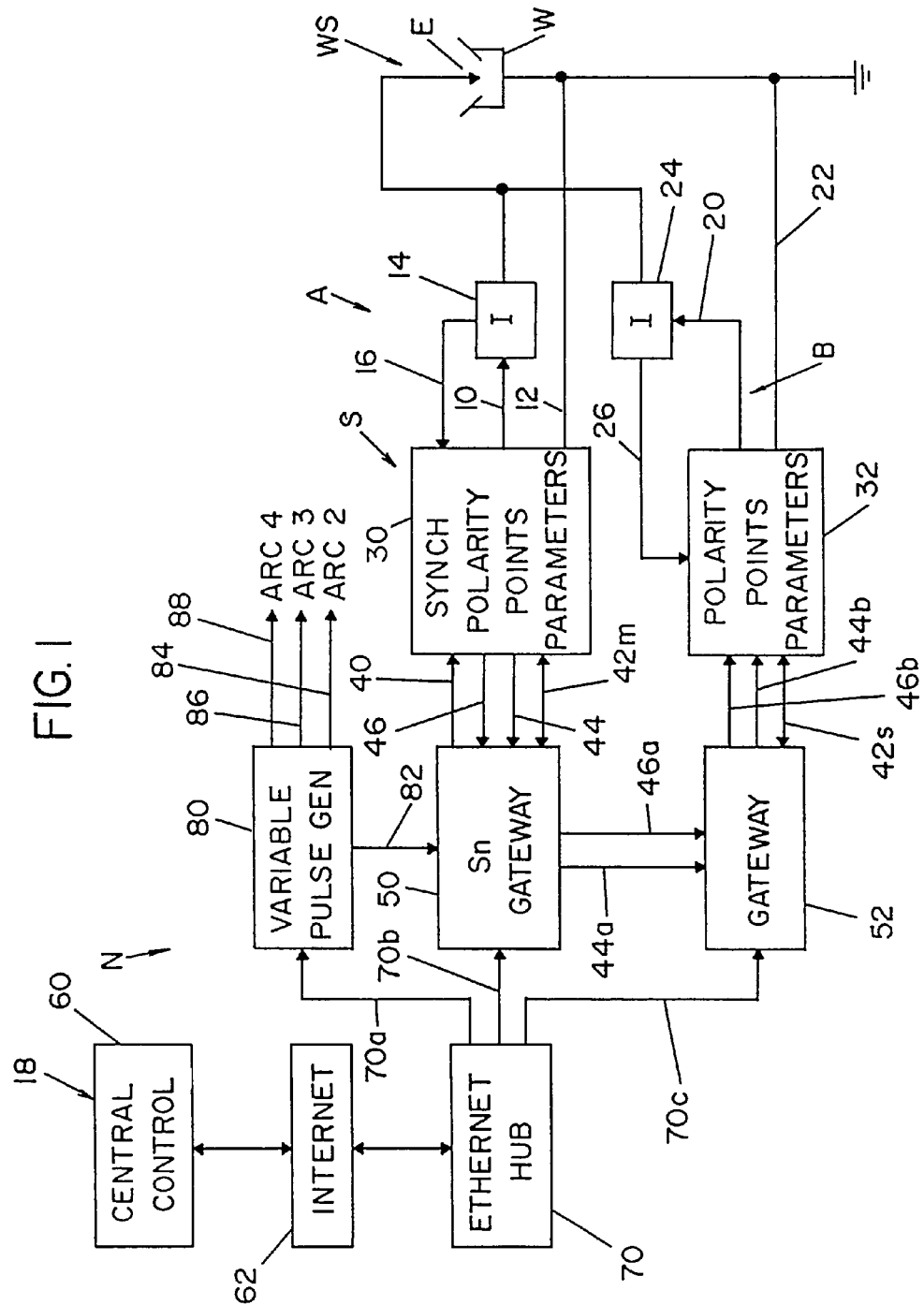
FIG. 1 is a block diagram of a welding system that can be used to perform the present invention.
Figure 5:
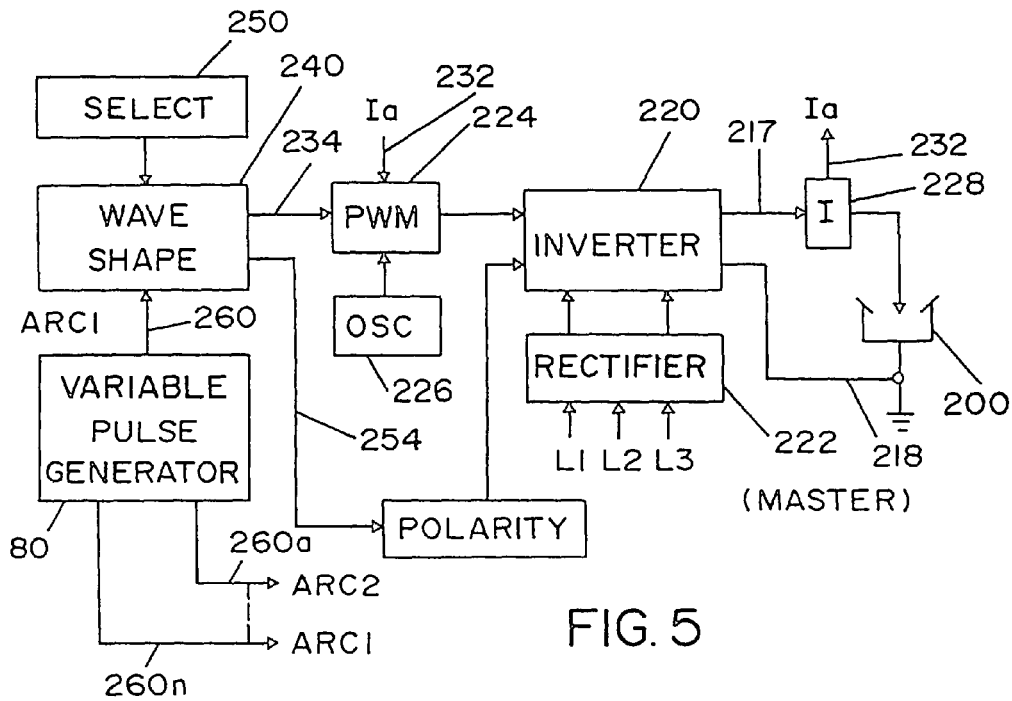
FIG. 5 is a block diagram showing a single electrode driven by the system as shown in FIG. 4 with a variable pulse generator disclosed in Houston U.S. Pat. No. 6,472,634 and used for practicing the present invention.

Turning now to the general background waveform technology systems to illustrate the type of waveform control used in the present invention, FIG. 1 discloses a single electric arc welding system S in the form of a single cell to create an alternating current as an arc at weld station WS. This system or cell includes a first master welder A with output leads 10, 12 in series with electrode E and workpiece W in the form of a pipe seam joint or other welding operation. Hall effect current transducer 14 provides a voltage in line 16 proportional to the current of welder A. Less time critical data, such as welding parameters, are generated at a remote central control 18. In a like manner, a slave following welder B includes leads 20, 22 connected in parallel with leads 10, 12 to direct an additional AC current to the weld station WS. Hall effect current transducer 24 creates a voltage in line 26 representing current levels in welder B during the welding operation. Even though a single slave or follower welder B is shown, any number of additional welders can be connected in parallel with master welder A to produce an alternating current across electrode E and workpiece W. The AC current is combined at the weld station instead of prior to a polarity switching network. Each welder includes a controller and inverter based power supply illustrated as a combined master controller and power supply 30 and a slave controller and power supply 32. Controllers 30, 32 receive parameter data and synchronization data from a relatively low level logic network. The parameter information or data is power supply specific whereby each of the power supplies is provided with the desired parameters such as current, voltage and/or wire feed speed. A low level digital network can provide the parameter information; however, the AC current for polarity reversal occurs at the same time. The "same" time indicates a time difference of less than 10 μs and preferably in the general range of 1-5 μs. To accomplish precise coordination of the AC output from power supply 30 and power supply 32, the switching points and polarity information can not be provided from a general logic network wherein the timing is less precise. The individual AC power supplies are coordinated by high speed, highly accurate DC logic interface referred to as "gateways." As shown in FIG. 1, power supplies 30, 32 are provided with the necessary operating parameters indicated by the bi-directional leads 42m, 42s, respectively. This non-time sensitive information is provided by a digital network shown in FIG. 1. Master power supply 30 receives a synchronizing signal as indicated by unidirectional line 40 to time the controllers operation of its AC output current. The polarity of the AC current for power supply 30 is outputted as indicated by line 46. The actual switching command for the AC current of master power supply 30 is outputted on line 44. The switch command tells power supply S, in the form of an inverter, to "kill," which is a drastic reduction of current. In an alternative, this is actually a switch signal to reverse polarity. The "switching points" or command on line 44 preferably is a "kill" and current reversal commands utilizing the "switching points" as set forth in Stava U.S. Pat. No. 6,111,216. Thus, timed switching points or commands are outputted from power supply by line 44. These switching points or commands may involve a power supply "kill" followed by a switch ready signal at a low current or merely a current reversal point. The switch "ready" is used when the "kill" concept is implemented because neither inverters are to actually reverse until they are below the set current. This concept is better described in FIG. 16. The polarity of the switches of controller 30 controls the logic on line 46. Slave power supply 32 receives the switching point or command logic on line 44b and the polarity logic on line 46b. These two logic signals are interconnected between the master power supply and the slave power supply through the highly accurate logic interface shown as gateway 50, the transmitting gateway, and gateway 52, the receiving gateway on lines 44a, 46a. These gateways are network interface cards for each of the power supplies so that the logic on lines 44b, 46b are timed closely to the logic on lines 44, 46, respectively. In practice, network interface cards or gateways 50, 52 control this logic to within 10 μs and preferably within 1-5 μs. A low accuracy network controls the individual power supplies for data from central control 18 through lines 42m, 42s, illustrated as provided by the gateways or interface cards. These lines contain data from remote areas (such as central control 18) which are not time sensitive and do not use the accuracy characteristics of the gateways. The highly accurate data for timing the switch reversal uses interconnecting logic signals through network interface cards 50, 52. The system in FIG. 1 is a single cell for a single AC arc; however, the invention is not limited to tandem electrodes wherein two or more AC arcs are created to fill the large gap found in pipe welding. However, the background system is shown for this application. Thus, the master power supply 30 for the first electrode receives a synchronization signal which determines the timing or phase operation of the system S for a first electrode, i.e. ARC 1. System S can be used with other identical systems to generate ARCs 2, 3, and 4 timed by synchronizing outputs 84, 86 and 88. This concept is schematically illustrated in FIG. 5. The synchronizing or phase setting signals 82-88 are shown in FIG. 1 with only one of the tandem electrodes. An information network N comprising a central control computer and/or web server 60 provides digital information or data relating to specific power supplies in several systems or cells controlling different electrodes in a tandem operation. Internet information 62 is directed to a local area network in the form of an ethernet network 70 having local interconnecting lines 70a, 70b, 70c. Similar interconnecting lines are directed to each power supply used in the four cells creating ARCs 1, 2, 3 and 4 of a tandem welding operation. The description of system or cell S applies to each of the arcs at the other electrodes. If AC current is employed, a master power supply is used. In some instances, merely a master power supply is used with a cell specific synchronizing signal. If higher currents are required, the systems or cells include a master and slave power supply combination as described with respect to system S of FIG. 1. Two or more AC arcs are synchronized by generator 80. Often a DC arc is used for the leading electrode in a tandem electrode welding operation, followed by two or more synchronized AC arcs. A DC power supply need not be synchronized, nor is there a need for accurate interconnection of the polarity logic and switching points or commands. Some DC powered electrodes may be switched between positive and negative, but not at the frequency of an AC driven electrode. Irrespective of the make-up of the arcs, ethernet or local area network 70 includes the parameter information identified in a coded fashion designated for specific power supplies of the various systems used in the tandem welding operation. This network also employs synchronizing signals for the several cells or systems whereby the systems can be offset in a time relationship. These synchronizing signals are decoded and received by a master power supply as indicated by line 40 in FIG. 1. In this manner, the AC arcs are offset on a time basis. These synchronizing signals are not required to be as accurate as the switching points through network interface cards or gateways 50, 52. Synchronizing signals on the data network are received by a network interface in the form of a variable pulse generator 80. The generator creates offset synchronizing signals in lines 84, 86 and 88. These synchronizing signals dictate the phase of the individual alternating current cells for separate electrodes in the tandem operation. Synchronizing signals can be generated by interface 80 or actually received by the generator through the network 70. Network 70 merely activates generator 80 to create the delay pattern for the many synchronizing signals. Also, generator 80 can vary the frequency of the individual cells by frequency of the synchronizing pulses if that feature is desired in the tandem welding operation.

Figure 2:
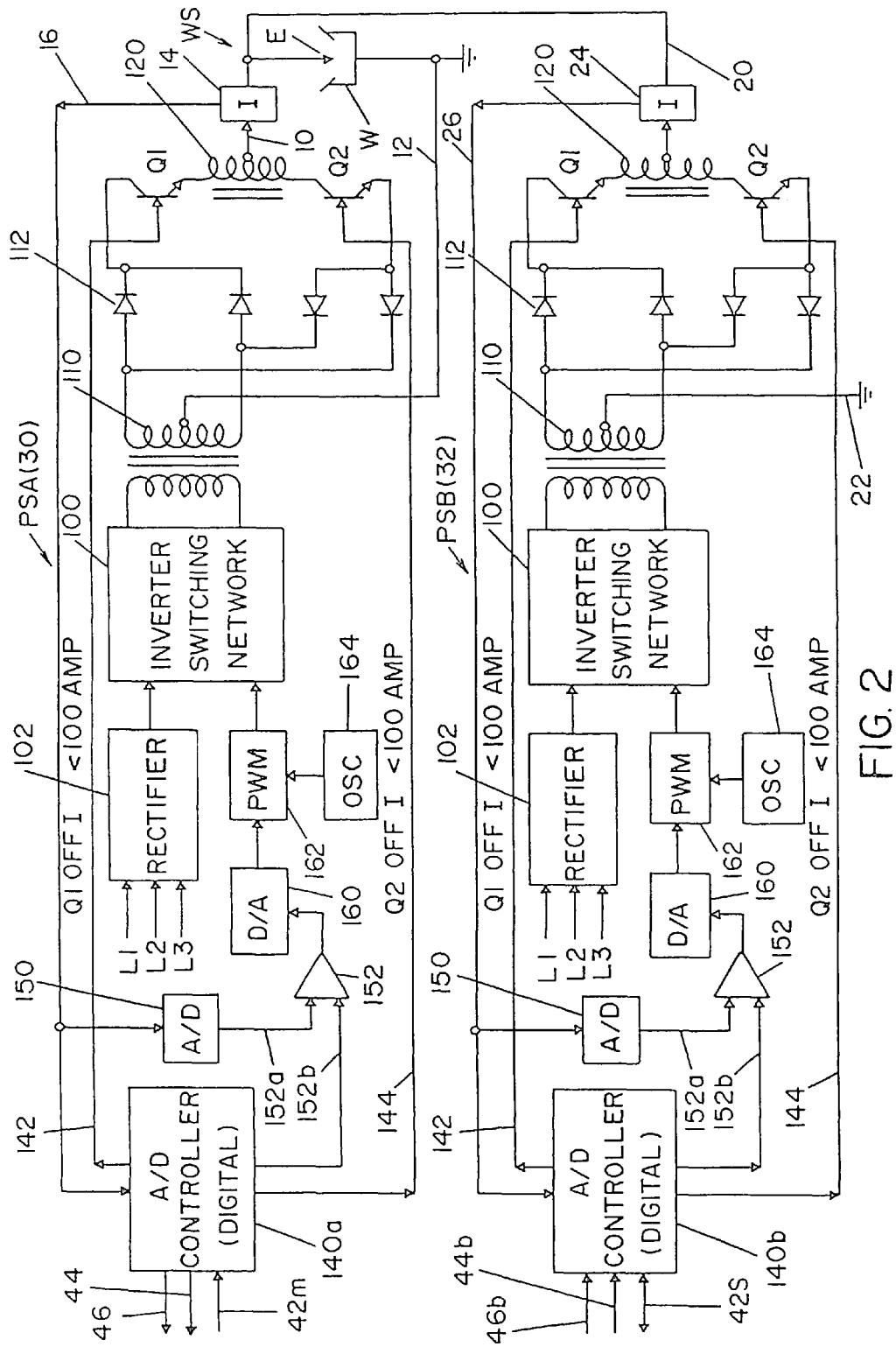
FIG. 2 is a wiring diagram of two paralleled power sources, each of which include a switching output and can be used in practicing the invention.

A variety of controllers and power supplies could be used for practicing the system as described in FIG. 1; however, preferred implementation of the system is set forth in FIG. 2 wherein power supply PSA is combined with controller and power supply 30 and power supply PSB is combined with controller and power supply 32. These two units are essentially the same in structure and are labeled with the same numbers when appropriate. Description of power supply PSA applies equally to power supply PSB. Inverter 100 has an input rectifier 102 for receiving three phase line current L1, L2, and L3. Output transformer 110 is connected through an output rectifier 112 to tapped inductor 120 for driving opposite polarity switches Q1, Q2. Controller 140a of power supply PSA and controller 140b of PSB are essentially the same, except controller 140a outputs timing information to controller 140b. Switching points or lines 142, 144 control the conductive condition of polarity switches Q1, Q2 for reversing polarity at the time indicated by the logic on lines 142, 144, as explained in more detail in Stava U.S. Pat. No. 6,111,216 incorporated by reference herein. The control is digital with a logic processor; thus, A/D converter 150 converts the current information on feedback line 16 or line 26 to controlling digital values for the level of output from error amplifier 152 which is illustrated as an analog error amplifier. In practice, this is a digital system and there is no further analog signal in the control architecture. As illustrated, however, amplifier has a first input 152a from converter 150 and a second input 152b from controller 140a or 140b. The current command signal on line 152b includes the wave shape or waveform required for the AC current across the arc at weld station WS. This is standard practice as taught by several patents of Lincoln Electric, such as Blankenship U.S. Pat. No. 5,278,390, incorporated by reference. See also Stava U.S. Pat. No. 6,207,929, incorporated by reference. The output from amplifier 152 is converted to an analog voltage signal by converter 160 to drive pulse width modulator 162 at a frequency controlled by oscillator 164, which is a timer program in the processor software. The shape of the waveform at the arcs is the voltage or digital number at lines 152b. The frequency of oscillator 164 is greater than 18 kHz. The total architecture of this system is digitized in the preferred embodiment of the present invention and does not include reconversion back into analog signal. This representation is schematic for illustrative purposes and is not intended to be limiting of the type of power supply used in practicing the present invention. Other power supplies could be employed.

Figure 3:
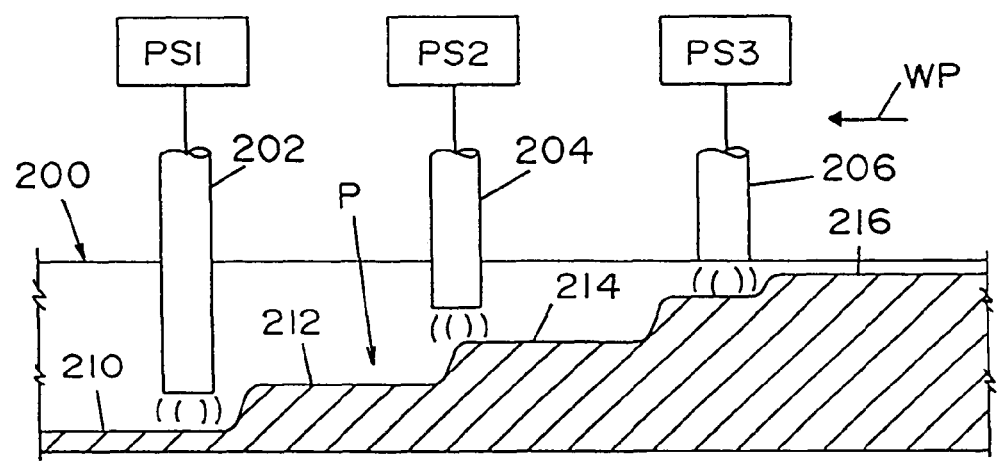
FIG. 3 is a cross sectional side view of three tandem electrodes of the type controllable by the power source disclosed in FIGS. 1 and 2.
Figure 4:
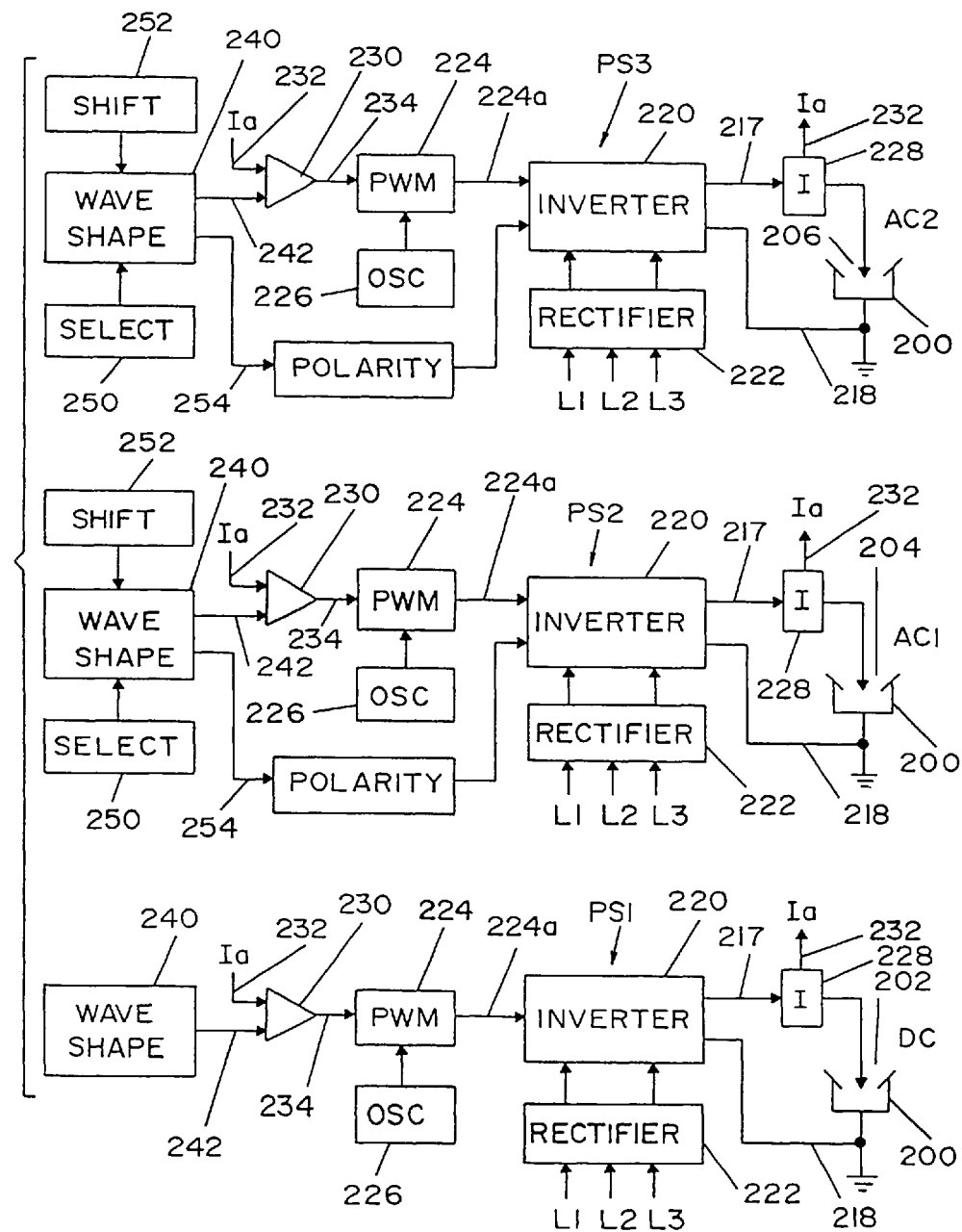
FIG. 4 is a schematic layout in block form of a welding system for three electrodes using the disclosure in Houston U.S. Pat. No. 6,472,634 and Stava U.S. Pat. No. 6,291,798 and where one of the three power sources is used in forming a precise tailored waveform by the program as shown in FIG. 17.
Figure 7:
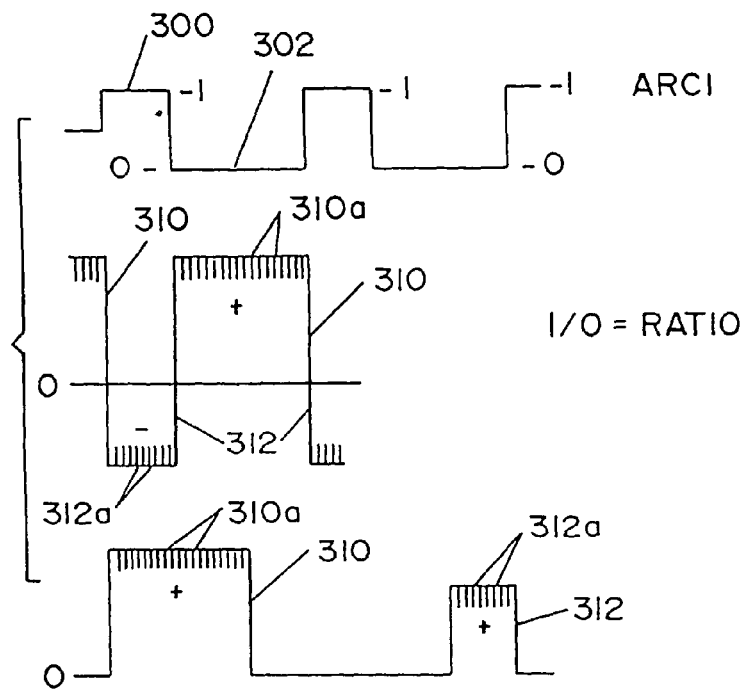
FIG. 7 is a current graph superimposed upon a polarity signal having logic to determine the polarity of the waveform as used in a welder that can practice the present invention as shown in FIGS. 17, 21 AND 27.

A background system utilizing the concepts of FIGS. 1 and 2 are illustrated in FIGS. 3 and 4. Workpiece 200 is a seam in a pipe which is welded together by tandem electrodes 202, 204 and 206 powered by individual power supplies PS1, PS2, PS3, respectively. The power supplies can include more than one power source coordinated in accordance with the technology in Houston U.S. Pat. No. 6,472,634. The illustrated embodiment involves a DC arc for lead electrode 202 and an AC arc for each of the tandem electrodes 204, 206. The created waveforms of the tandem electrodes are AC currents and include shapes created by a wave shaper or wave generator in accordance with the previously described waveform technology. As electrodes 202, 204 and 206 are moved along weld path WP a molten metal puddle P is deposited in pipe seam 200 with an open root portion 210 followed by deposits 212, 214 and 216 from electrodes 202, 204 and 206, respectively. As previously described more than two AC driven electrodes as will be described and illustrated by the waveforms of FIG. 15, can be operated by the invention relating to AC currents of adjacent electrodes. The power supplies, as shown in FIG. 4, each include an inverter 220 receiving a DC link from rectifier 222. In accordance with Lincoln waveform technology, a chip or internal programmed pulse width modulator stage 224 is driven by an oscillator 226 at a frequency greater than 18 kHz and preferably greater than 20 kHz. As oscillator 226 drives pulse width modulator 224, the output current has a shape dictated by the wave shape outputted from wave shaper 240 as a voltage or digital numbers at line 242. Output leads 217, 218 are in series with electrodes 202, 204 and 206. The shape in real time is compared with the actual arc current in line 232 from Hall Effect transducer 228 by a stage illustrated as comparator 230 so that the outputs on line 234 controls the shape of the AC waveforms. The digital number or voltage on line 234 determines the output signal on line 224a to control inverter 220 so that the waveform of the current at the arc follows the selected profile outputted from wave shaper 240. This is standard Lincoln waveform technology, as previously discussed. Power supply PS1 creates a DC arc at lead electrode 202; therefore, the output from wave shaper 240 of this power supply is a steady state indicating the magnitude of the DC current. The present invention does not relate to the formation of a DC arc. To the contrary, the present invention is the control of the current at two adjacent AC arcs for tandem electrodes, such as electrodes 204, 206. In accordance with the invention, wave shaper 240 involves an input 250 employed to select the desired shape or profile of the AC waveform. This shape can be shifted in real time by an internal programming schematically represented as shift program 252. Wave shaper 240 has an output which is a priority signal on line 254. In practice, the priority signal is a bit of logic, as shown in FIG. 7. Logic 1 indicates a negative polarity for the waveform generated by wave shaper 240 and logic 0 indicates a positive polarity. This logic signal or bit controller 220 directed to the power supply is read in accordance with the technology discussed in FIG. 16. The inverter switches from a positive polarity to a negative polarity, or the reverse, at a specific "READY" time initiated by a change of the logic bit on line 254. In practice, this bit is received from variable pulse generator 80 shown in FIG. 1 and in FIG. 5. The background welding system shown in FIGS. 3 and 4 uses the shapes of AC arc currents at electrodes 204 and 206 to obtain a beneficial result, i.e. a generally quiescent molten metal puddle P and/or synthesized sinusoidal waveforms compatible with transformer waveforms used in arc welding. The electric arc welding system shown in FIGS. 3 and 4 have a program to select the waveform at "SELECT" program 250 for wave shaper 240. The unique waveforms are used by the tandem electrodes. One of the power supplies to create an AC arc is schematically illustrated in FIG. 5. The power supply or source is controlled by variable pulse generator 80, shown in FIG. 1. Signal 260 from the generator controls the power supply for the first arc. This signal includes the synchronization of the waveform together with the polarity bit outputted by the wave shaper 240 on line 254. Lines 260a-260n control the desired subsequent tandem AC arcs operated by the welding system of the present invention. The timing of these signals shifts the start of the other waveforms. FIG. 5 merely shows the relationship of variable pulse generator 80 to control the successive arcs as explained in connection with FIG. 4.

Figure 6:
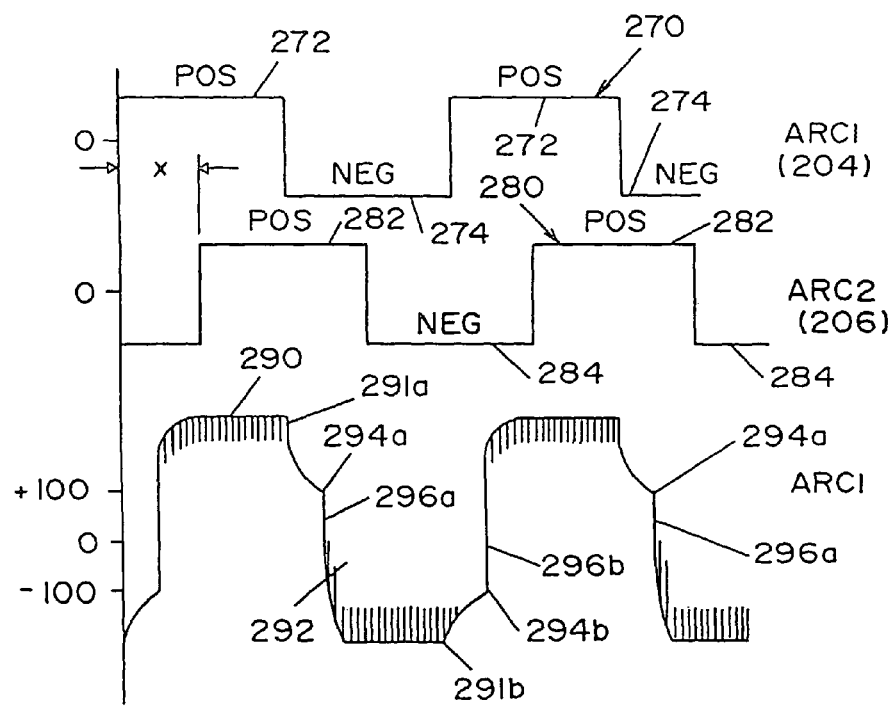
FIG. 6 is a current graph for one of two illustrated synchronizing pulses and showing a balanced AC waveform for one tandem electrode.
Figure 8:
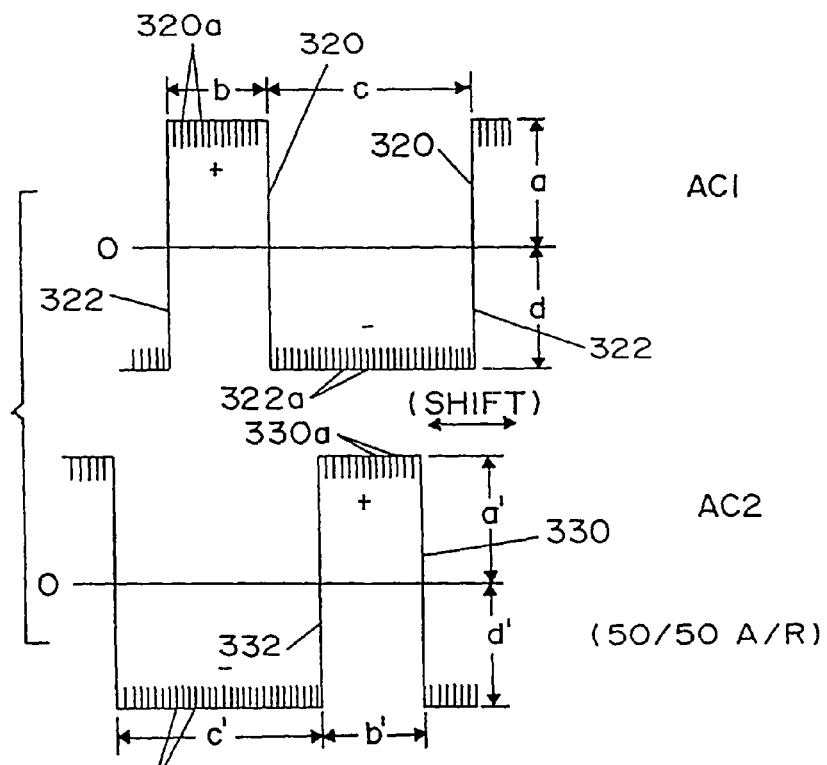
FIG. 8 is a current graph showing a broad aspect of a waveform with a profile for a given cored electrode and outputted by the welder shown in FIGS. 21 and 27.

In the welding system of Houston U.S. Pat. No. 6,472,634, the AC waveforms are created as shown in FIG. 6 wherein the wave shaper for arc AC1 at electrode 204 creates a signal 270 having positive portions 272 and negative portions 274. The second arc AC2 at electrode 206 is controlled by signal 280 from the wave shaper having positive portions 282 and negative portions 284. These two signals are the same, but are shifted by the signal from generator 80 a distance x, as shown in FIG. 6. The waveform technology created current pulses or waveforms at one of the arcs are waveforms having positive portions 290 and negative portions 292 shown at the bottom portion of FIG. 6. A logic bit from the wave shaper determines when the waveform is switched from the positive polarity to the negative polarity and the reverse. In accordance with the disclosure in Stava U.S. Pat. No. 6,111,216 (incorporated by reference herein) pulse width modulator 224 is generally shifted to a lower level at point 291a and 291b. Then the current reduces until reaching a fixed level, such as 100 amps. Consequently, the switches change polarity at points 294a and 294b. This produces a vertical line or shape 296a, 296b when current transitioning between positive portion 290 and negative portion 292. This is the system disclosed in the Houston patent where the like waveforms are shifted to avoid magnetic interference. The waveform portions 290, 292 are the same at arc AC1 and at arc AC2. This is different from the present invention which relates to customizing the waveforms at arc AC1 and arc AC2 for purposes of controlling the molten metal puddle and/or synthesizing a sinusoidal wave shape in a manner not heretofore employed. The disclosure of FIG. 6 is set forth to show the concept of shifting the waveforms. The same switching procedure to create a vertical transition between polarities is used in the preferred embodiment of the present invention. Converting from the welding system shown in FIG. 6 to an imbalance waveform is generally shown in FIG. 7. The logic on line 254 is illustrated as being a logic 1 in portions 300 and a logic 0 in portions 302. The change of the logic or bit numbers signals the time when the system illustrated in FIG. 16 shifts polarity. This is schematically illustrated in the lower graph of FIG. 6 at points 294a, 294b. Wave shaper 240 for each of the adjacent AC arcs has a first wave shape 310 for one of the polarities and a second wave shape 312 for the other polarity. Each of the waveforms 310, 312 are created by the logic on line 234 taken together with the logic on line 254. Thus, pulses 310, 312 as shown in FIG. 7, are different pulses for the positive and negative polarity portions. Each of the pulses 310, 312 are created by separate and distinct current pulses 310a, 312a as shown. Switching between polarities is accomplished as illustrated in FIG. 6 where the waveforms generated by the wave shaper are shown as having the general shape of waveforms 310, 312. Positive polarity controls penetration and negative polarity controls deposition. The positive and negative pulses of a waveform are different and the switching points are controlled so that the AC waveform at one arc is controlled both in the negative polarity and the positive polarity to have a specific shape created by the output of wave shaper 240. The waveforms for the arc adjacent to the arc having the current shown in FIG. 7 is controlled differently to obtain the advantages illustrated best in FIG. 8. The waveform at arc AC1 is in the top part of FIG. 8. It has positive portions 320 shown by current pulses 320a and negative portions 322 formed by pulses 322a. Positive portion 320 has a maximum magnitude a and width or time period b. Negative portion 322 has a maximum magnitude d and a time or period c. These four parameters are adjusted by wave shaper 240. In the illustrated embodiment, arc AC2 has the waveform shown at the bottom of FIG. 8 where positive portion 330 is formed by current pulses 330a and has a height or magnitude a' and a time length or period b'. Negative portion 332 is formed by pulses 332a and has a maximum amplitude d' and a time length c'. These parameters are adjusted by wave shaper 240. In accordance with the invention, the waveform from the wave shaper on arc AC1 is out of phase with the wave shape for arc AC2. The two waveforms have parameters or dimensions which are adjusted so that (a) penetration and deposition is controlled and (b) there is no long time during which the puddle P is subjected to a specific polarity relationship, be it a like polarity or opposite polarity. This concept in formulating the wave shapes prevents long term polarity relationships as explained by the showings in FIGS. 9 and 10. In FIG. 9 electrodes 204, 206 have like polarity, determined by the waveforms of the adjacent currents at any given time. At that instance, magnetic flux 350 of electrode 204 and magnetic flux 352 of electrode 206 are in the same direction and cancel each other at center area 354 between the electrodes. This causes the molten metal portions 360, 362 from electrodes 204, 206 in the molten puddle P to move together, as represented by arrows c. This inward movement together or collapse of the molten metal in puddle P between electrodes 204 will ultimately cause an upward gushing action, if not terminated in a very short time, i.e. less than about 20 ms. As shown in FIG. 10, the opposite movement of the puddle occurs when the electrodes 204, 206 have opposite polarities. Then, magnetic flux 370 and magnetic flux 372 are accumulated and increased in center portion 374 between the electrodes. High forces between the electrodes causes the molten metal portions 364, 366 of puddle P to retract or be forced away from each other. This is indicated by arrows r. Such outward forcing of the molten metal in puddle P causes disruption of the weld bead if it continues for a substantial time which is generally less than 10 ms. As can be seen from FIGS. 9 and 10, it is desirable to limit the time during which the polarity of the waveform at adjacent electrodes is either the same polarity or opposite polarity. The waveform, such as shown in FIG. 6, accomplishes the objective of preventing long term concurrence of specific polarity relationships, be it like polarities or opposite polarities. As shown in FIG. 8, like polarity and opposite polarity is retained for a very short time less than the cycle length of the waveforms at arc AC1 and arc AC2. This positive development of preventing long term occurrence of polarity relationships together with the novel concept of pulses having different shapes and different proportions in the positive and negative areas combine to control the puddle, control penetration and control deposition in a manner not heretofore obtainable in welding with a normal transformer power supplies or normal use of Lincoln waveform technology.

In FIG. 11 the positive and negative portions of the AC waveform from the wave shaper 240 are synthesized sinusoidal shapes with a different energy in the positive portion as compared to the negative portion of the waveforms. The synthesized sine wave or sinusoidal portions of the waveforms allows the waveforms to be compatible with transformer welding circuits and compatible with evaluation of sine wave welding. In FIG. 11, waveform 370 is at arc AC1 and waveform 372 is at arc AC2. These tandem arcs utilize the AC welding current shown in FIG. 11 wherein a small positive sinusoidal portion 370a controls penetration at arc AC1 while the larger negative portion 370b controls the deposition of metal at arc AC1. There is a switching between the polarities with a change in the logic bit, as discussed in FIG. 7. Sinusoidal waveform 370 plunges vertically from approximately 100 amperes through zero current as shown in by vertical line 370c. Transition between the negative portion 370b and positive portion 370a also starts a vertical transition at the switching point causing a vertical transition 370d. In a like manner, phase shifted waveform 372 of arc AC2 has a small penetration portion 372a and a large negative deposition portion 372b. Transition between polarities is indicated by vertical lines 372c and 372d. Waveform 372 is shifted with respect to waveform 370 so that the dynamics of the puddle are controlled without excessive collapsing or repulsion of the molten metal in the puddle caused by polarities of adjacent arcs AC1, AC2. In FIG. 11, the sine wave shapes are the same and the frequencies are the same. They are merely shifted to prevent a long term occurrence of a specific polarity relationship.

Figure 12:
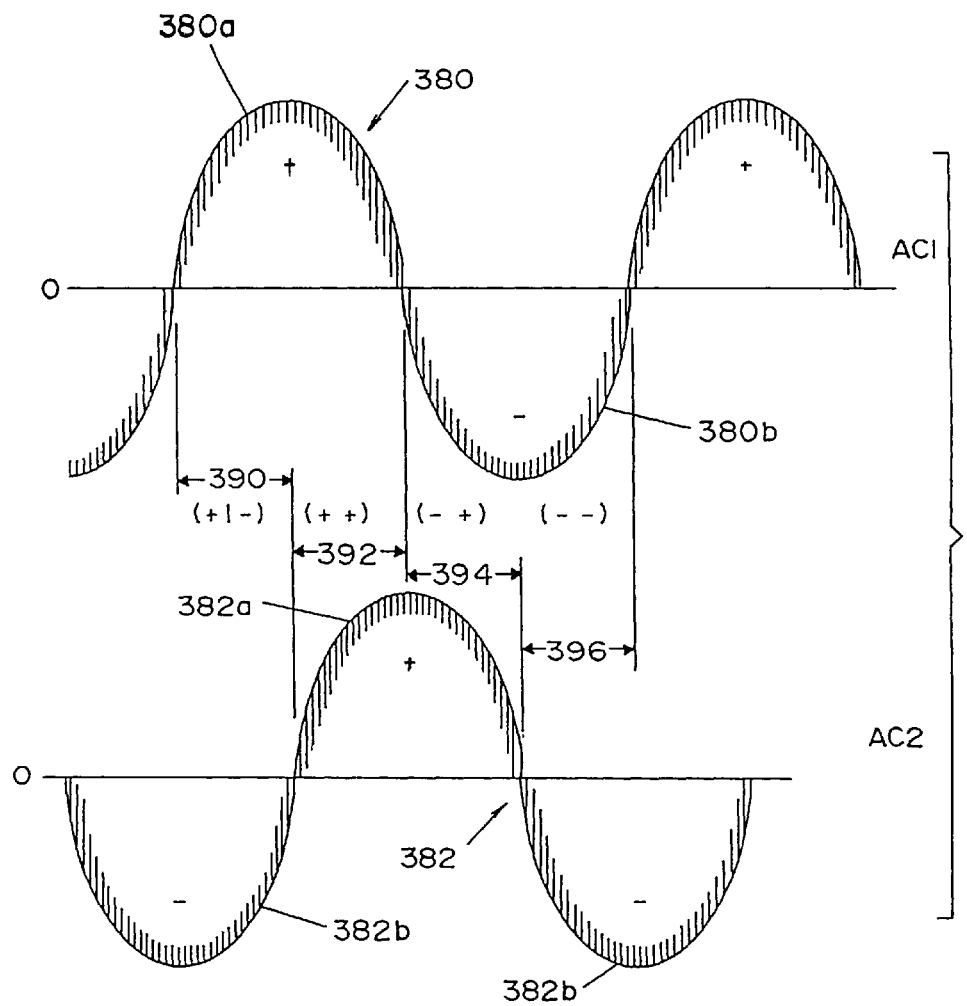
FIG. 12 is a pair of current graphs of the AC waveforms on adjacent tandem electrodes with areas of concurring polarity relationships, where each waveform can be coordinated with a given electrode.
Figure 13:
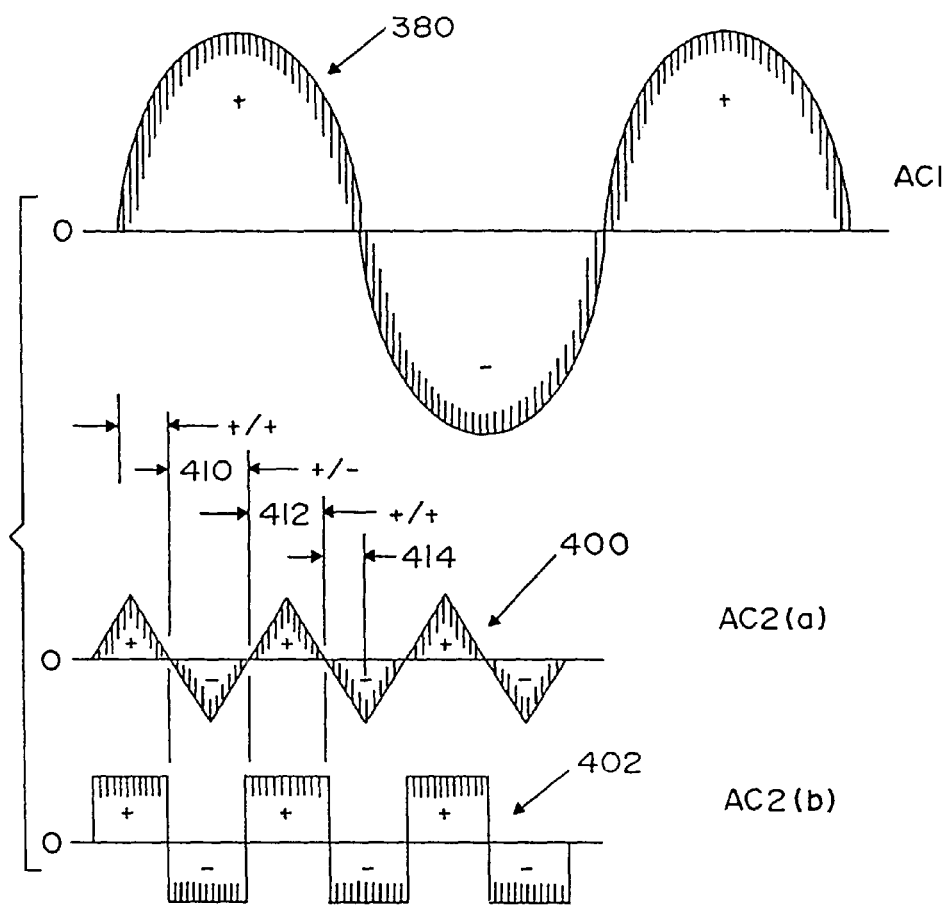
FIG. 13 are current graphs of the waveforms on adjacent tandem electrodes wherein the AC waveform of one electrode is substantially different waveform of the other electrode to limit the time of concurrent polarity relationships.
Figure 14:
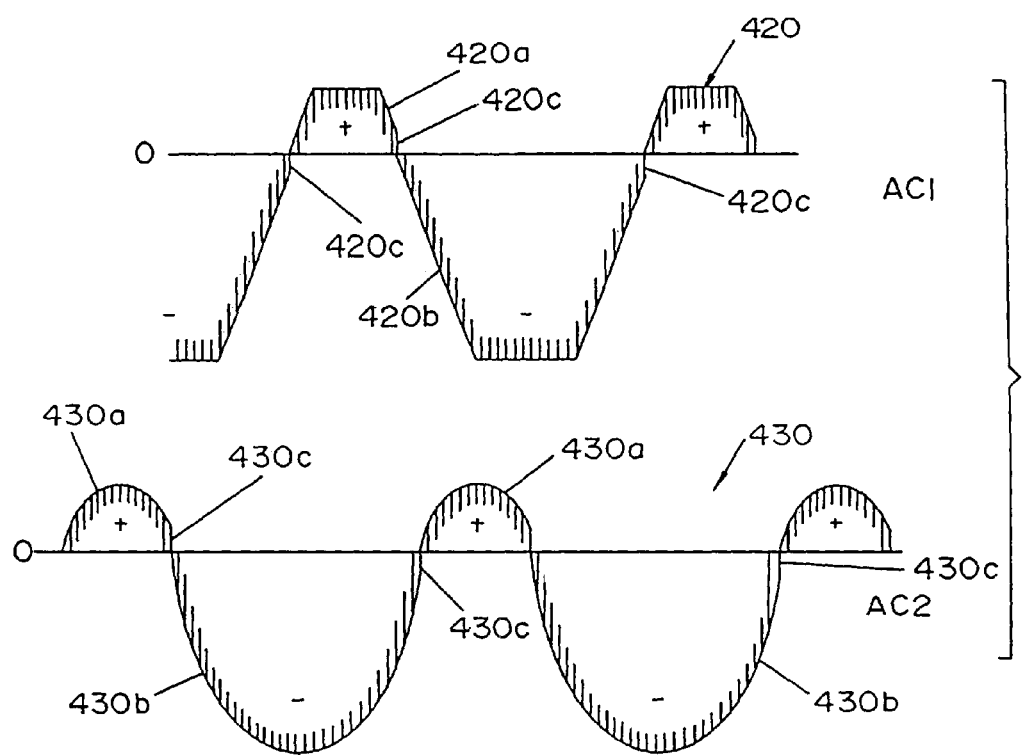
FIG. 14 are current graphs of two sinusoidal waveforms for adjacent electrodes operated by a system in the background of the invention with different shaped waveforms for the adjacent electrodes.

In FIG. 12 waveform 380 is used for arc AC1 and waveform 382 is used for arc AC2. Portions 380a, 380b, 382a, and 382b are sinusoidal synthesized and are illustrated as being of the same general magnitude. By shifting these two waveforms 90°, areas of concurrent polarity are identified as areas 390, 392, 394 and 396. By using the shifted waveforms with sinusoidal profiles, like polarities or opposite polarities do not remain for any length of time. Thus, the molten metal puddle is not agitated and remains quiescent. This advantage is obtained by using the present invention which also combines the concept of a difference in energy between the positive and negative polarity portions of a given waveform. FIG. 12 is illustrative in nature to show the definition of concurrent polarity relationships and the fact that they should remain for only a short period of time. To accomplish this objective, another embodiment of the present invention is illustrated in FIG. 13 wherein previously defined waveform 380 is combined with waveform 400, shown as the sawtooth waveform of arc AC2 (a) or the pulsating waveform 402 shown as the waveform for arc AC2(b). Combining waveform 380 with the different waveform 400 of a different waveform 402 produces very small areas or times of concurrent polarity relationships 410, 412, 414, etc. In FIG. 14 the AC waveform generated at one arc is drastically different than the AC waveform generated at the other arc. This same concept of drastically different waveforms for use in the present invention is illustrated in FIG. 14 wherein waveform 420 is an AC pulse profile waveform and waveform 430 is a sinusoidal profile waveform having about one-half the period of waveform 420. Waveform 420 includes a small penetration positive portion 420a and a large deposition portion 420b with straight line polarity transitions 420c. Waveform 430 includes positive portion 430a and negative portion 430b with vertical polarity transitions 430c. By having these two different waveforms, both the synthesized sinusoidal concept is employed for one electrode and there is no long term concurrent polarity relationship. Thus, the molten metal in puddle P remains somewhat quiescent during the welding operation by both arcs AC1, AC2.

In FIG. 15 waveforms 450, 452, 454 and 456 are generated by the wave shaper 240 of the power supply for each of four tandem arcs, arc AC1, arc AC2, arc AC3 and arc AC4. The adjacent arcs are aligned as indicated by synchronization signal 460 defining when the waveforms correspond and transition from the negative portion to the positive portion. This synchronization signal is created by generator 80 shown in FIG. 1, except the start pulses are aligned. In this embodiment of the invention first waveform 450 has a positive portion 450a, which is synchronized with both the positive and negative portion of the adjacent waveform 452, 454 and 456. For instance, positive portion 450a is synchronized with and correlated to positive portion 452a and negative portion 452b of waveform 452. In a like manner, the positive portion 452a of waveform 452 is synchronized with and correlated to positive portion 454a and negative portion 454b of waveform 454. The same relationship exist between positive portion 454a and the portions 456a, 456b of waveform 456. The negative portion 450b is synchronized with and correlated to the two opposite polarity portions of aligned waveform 452. The same timing relationship exist between negative portion 452b and waveform 454. In other words, in each adjacent arc one polarity portion of the waveform is correlated to a total waveform of the adjacent arc. In this manner, the collapse and repelling forces of puddle P, as discussed in connection with FIGS. 9 and 10, are diametrically controlled. One or more of the positive or negative portions can be synthesized sinusoidal waves as discussed in connection with the waveforms disclosed in FIGS. 11 and 12.

As indicated in FIGS. 1 and 2, when the master controller of switches is to switch, a switch command is issued to master controller 140a of power supply 30. This causes a "kill" signal to be received by the master so a kill signal and polarity logic is rapidly transmitted to the controller of one or more slave power supplies connected in parallel with a single electrode. If standard AC power supplies are used with large snubbers in parallel with the polarity switches, the slave controller or controllers are immediately switched within 1-10 μs after the master power supply receives the switch command. This is the advantage of the high accuracy interface cards or gateways. In practice, the actual switching for current reversal of the paralleled power supplies is not to occur until the output current is below a given value, i.e. about 100 amperes. This allows use of smaller switches.

The implementation of the switching for all power supplies for a single AC arc uses the delayed switching technique where actual switching can occur only after all power supplies are below the given low current level. The delay process is accomplished in the software of the digital processor and is illustrated by the schematic layout of FIG. 16. When the controller of master power supply 500 receives a command signal as represented by line 502, the power supply starts the switching sequence. The master outputs a logic on line 504 to provide the desired polarity for switching of the slaves to correspond with polarity switching of the master. In the commanded switch sequence, the inverter of master power supply 500 is turned off or down so current to electrode E is decreased as read by hall effect transducer 510. The switch command in line 502 causes an immediate "kill" signal as represented by line 512 to the controllers of paralleled slave power supplies 520, 522 providing current to junction 530 as measured by hall effect transducers 532, 534. All power supplies are in the switch sequence with inverters turned off or down. Software comparator circuits 550, 552, 554 compare the decreased current to a given low current referenced by the voltage on line 556. As each power supply decreases below the given value, a signal appears in lines 560, 562, and 564 to the input of a sample and hold circuits 570, 572, and 574, respectively. The circuits are outputted by a strobe signal in line 580 from each of the power supplies. When a set logic is stored in a circuit 570, 572, and 574, a YES logic appears on lines READY[1], READY[2], and READY[3] at the time of the strobe signal. This signal is generated in the power supplies and has a period of 25 μs; however, other high speed strobes could be used. The signals are directed to controller C of the master power supply, shown in dashed lines in FIG. 16. A software ANDing function represented by AND gate 584 has a YES logic output on line 582 when all power supplies are ready to switch polarity. This output condition is directed to clock enable terminal ECLK of software flip flop 600 having its D terminal provided with the desired logic of the polarity to be switched as appearing on line 504. An oscillator or timer operated at about 1 MHz clocks flip flop by a signal on line 602 to terminal CK. This transfers the polarity command logic on line 504 to a Q terminal 604 to provide this logic in line 610 to switch slaves 520, 522 at the same time the identical logic on line 612 switches master power supply 500. After switching, the polarity logic on line 504 shifts to the opposite polarity while master power supply awaits the next switch command based upon the switching frequency. Other circuits can be used to effect the delay in the switching sequence; however, the illustration in FIG. 16 is the present scheme.

As so far described in FIGS. 1-16, the welder, and control system for the welder to accomplish other advantageous features is submitted as background information. This background technology has been developed by The Lincoln Electric Company, assignee of the present application. This background description is submitted for explanation of waveform technology welders. The waveforms can be DC as accomplished by the welder described or AC using the same technology. It has been found that this technology can be used to "paint" the exact profile of an AC waveform to be used in a welding process.

"Painting" AC Waveforms for Cored Electrodes

FIGS. 17-27

A precise AC waveform is obtained for cored electrodes by use of program 700. This "painted" AC waveform is coordinated with a specific cored electrode by using the technology illustrated in FIGS. 1-16.

Figure 19:
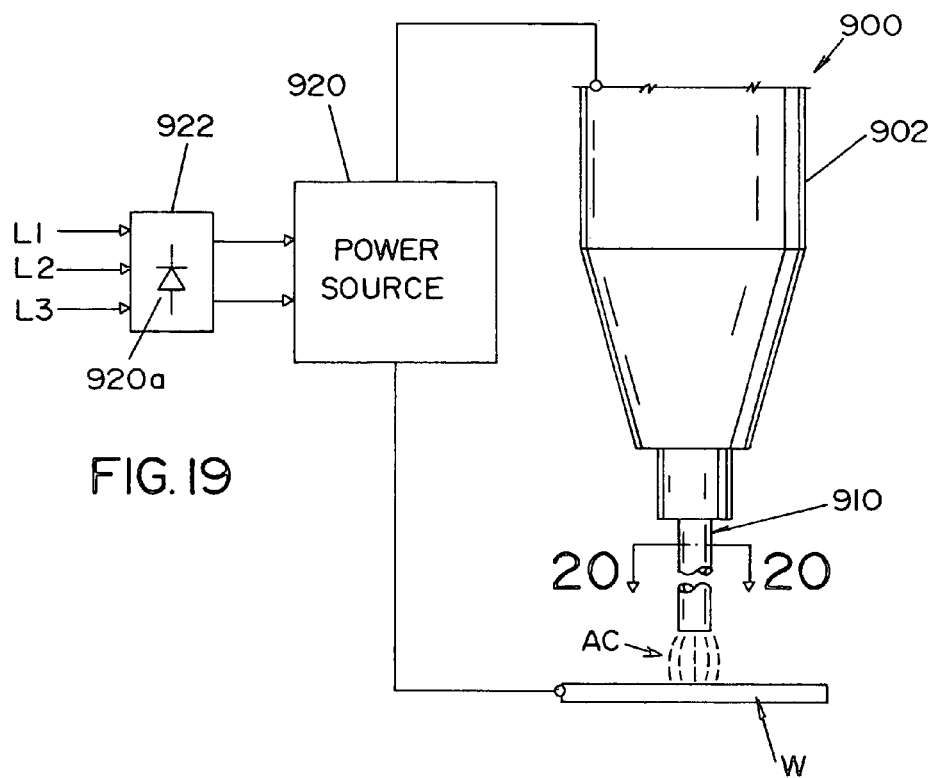
FIG. 19 is a side elevational view with a block diagram illustrating the use of the system in FIGS. 17 and 27 to control an AC waveform of the present invention.
Figure 20:
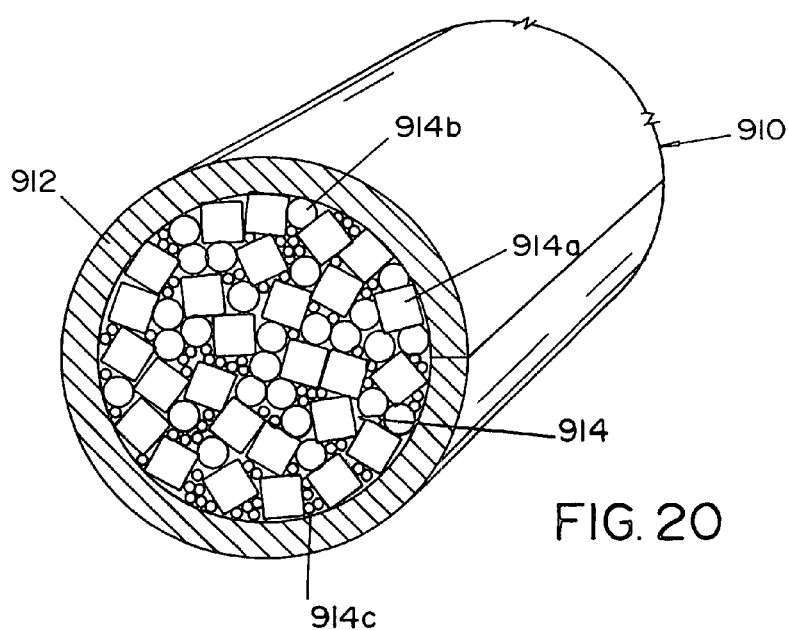
FIG. 20 is an enlarged cross-sectioned pictorial view taken generally along line 20-20 of FIG. 19.

The waveform technology welder and/or welding system, as shown in FIGS. 4 and 5, is operated by control program 700 to accurately set the exact profile of a given waveform for use with a specific cored electrode of the type shown in FIGS. 19 and 20. Program 700 is disclosed in FIG. 17, where welder 705 has a wave shaper 240 set to a general type of weld waveform by a select network 250. The selected waveform is the desired AC waveform to perform, by a succession of waveforms, a given welding process. This waveform, in accordance with the invention, is set to be used with a specific cored electrode. Waveform control program 700 has a profile control network 710 to set the exact, desired profile of the waveform and a magnitude control circuit 712 to adjust the energy or power of the waveform without substantially changing the set profile to be used for a given cored electrode. This specific AC profile is stored in the welder disclosed in FIGS. 21 and 28 for use when the corresponding electrode is to be used in the welding process. The concept of adjusting the AC waveform in both the positive section and negative section allows performance of the present invention.

The program or control network 700 is connected to the wave shaper 240 to control the exact general profile of each individual waveform in the succession of waveforms constituting an AC welding process. To accomplish this objective of accurate and precise synergistic setting of the waveform general profile, four separate profile parameters are adjusted individually. The first parameter is frequency set into the waveform profile by circuit 720 manually or automatically adjusted by interface network 722 to produce a set value on an output represented as line 724. This value controls the set frequency of the AC waveform profile. Of course, this is actually the period of the waveform. In a like manner, the duty cycle or wave balance of the waveform is controlled by circuit 730 having an adjustable interface network 732 and an output line 734 for developing a value to control the relationship between the positive half cycle and the negative half cycle of the AC waveform. This profile parameter is set by the logic or data on line 734 from circuit 730. By the signal or data on line 724 and the data on line 734, the AC profile of the waveform is set. This does not relate to the energy level of the individual portions of the waveform, but merely the general fixed profile of the waveform. To control the up ramp rate of the waveform there is provided a circuit 740 having a manual or automatic adjusting network 742 and an output signal on line 744 for setting the rate at which the set profile of the waveform changes from negative to a positive polarity. In a like manner, a down ramp circuit 750 is provided with an adjusting interface 752 and an output line 754. The magnitudes of the values on lines 724, 734, 744 and 754 set the profile of the individual waveform. At least two of these parameter profiles are set together; however, preferably all of the profile parameters are set to define a waveform profile.

To control the profile of the AC waveform for the purposes of the energy or power transmitted by each individual waveform in the welding process, program 700 includes magnitude circuit or network 712 divided into two individual sections 760, 762. These sections of the magnitude circuit control the energy or other power related level of the waveform during each of the polarities without substantially affecting the general profile set by profile control network 710. Section 760 includes a level control circuit 770 which is manually adjusted by an interface network 772 to control the relationship between an input value on line 774 and an output value on line 776. Level control circuit 770 is essentially a digital error amplifier circuit for controlling the current, voltage and/or power during the positive portion of the generated set waveform profile. Selector 250a shifts circuit 770 into either the current, voltage or power mode. Section 760 controls the energy, or power or other heat level during the positive portion of the waveform with changing the general profile set by network 710. In a like manner, second section 762 has a digital error amplifier circuit 780 that is set or adjusted by network 782 so that the value on input line 784 controls the level or signal on output line 786. Consequently, the digital level data on lines 776 and 786 controls the current, voltage and/or power during each of the half cycles set by profile control network 710. Selector 250b shifts circuit 780 into either the current, voltage or power mode.

In accordance with another feature of program 700, wave shaper 240 is controlled by only magnitude control circuit 712 and the profile is set by network or program 250 used in the background waveform controlling system, shown in FIGS. 4 and 5. Network 250 does not set the profile, but selects known types of AC waveforms as will be explained with the disclosure of FIGS. 21 and 28. The enhanced advantage of program 700 is realized by setting all profile parameters using circuits 720, 730, 740 and 750 together with the magnitude circuits 770, 780. Of course, an AC waveform controlled by any one of these circuits is an improvement over the general background technology of FIGS. 1-16. Program 700 synergistically adjusts all profile parameters and magnitude values during each polarity of the AC waveform so the waveform corresponds to a specific cored electrode.

To explain the capabilities of program 700, two AC waveforms are schematically illustrated in FIG. 18. AC waveform 800 has a positive portion 802 and a negative portion 804, both produced by a series of rapidly created current pulses 800a. Waveform 800 is illustrated as merely a square wave to illustrate control of the frequency or period of the waveform and the ratio of the positive portion 802 to the negative portion 804. These parameters are accurately set by using program 700 to modify the type of AC waveform heretofore merely selected by network 450. In this schematic representation of the AC waveform, the up ramp rate and the down ramp rate are essentially zero. Of course, the switching concept taught in Stava U.S. Pat. No. 6,111,216 would be employed for shifting between positive and negative waveform portions to obtain the advantages described in the Stava patent. Second illustrated waveform 810 has a frequency f, a positive portion 812 and a negative portion 814. In this illustration, the up ramp rate 816 is controlled independently of the down ramp rate 818. These ramp rates are illustrated as arrows to indicate they exist at the leading and trailing edges of the waveform during shifts between polarities. Program 700 relates to physically setting the exact profile of the individual waveforms by circuits 720, 730, 740 and 750. Several parameters of the waveform are adjusted to essentially "paint" the AC waveform into a desired profile. A very precise welding process using a set general profile for the AC waveform is performed by a waveform technology controlled welder, such as the Power Wave by The Lincoln Electric Company, using a control program, such as program 700. This program is used to "paint" an AC waveform for each individual cored electrode so there is a match between the AC waveform and the electrode used in the welding process.

Program 700 in FIG. 17 is used to construct or create AC waveforms that are optimized and specially tailored for each of individually identified cored electrode such as electrode 910 shown in FIGS. 19 and 20. A welder 900 has torch 902 for directing electrode 910 toward workpiece W. An arc AC is created between the end of electrode 910 and workpiece W. The electrode is a cored electrode with sheath 912 and internal filled core 914. The core includes flux ingredients, such as represented by particles 914a. The purpose of these ingredients 914a is to (a) shield the molten weld metal from atmospheric contamination by covering the molten metal with slag, (b) combine chemically with any atmospheric contaminants such that their negative impact on the weld quality is minimized and/or (c) generate arc shielding gases. In accordance with standard practice, core 914 also includes alloying ingredients, referred to as particles 914b, together with other miscellaneous particles 914c that are combined to provide the fill of core 914. To optimize the welding operation, it has been necessary to use solid wire with an external shielding gas. However, in order to produce a weld with specific mechanical and metallurgical properties, specific alloys are required, which can be difficult to obtain in the form of a solid wire. Contamination is difficult to prevent when using a welding process requiring external shielding gas. It would be advantageous to therefore use a self shielding cored electrode, so that the environment does not affect the welding. Cored electrodes experience different burn back rates for the sheath and core. All of these difficulties have resulted in most pipeline welding to be done with a solid wire and external shielding gas. To overcome these problems, STT welding was developed by The Lincoln Electric Company of Cleveland, Ohio for use in pipeline welding. Such welding employs a short circuit process where surface tension transfers the molten metal. This process lowers heat of the welding process, especially during open root welding. The advantages of both welding with an AC power source and cored electrodes were not obtainable because the welding waveforms were not optimized for a specific cored electrode. By controlling the AC waveform using waveform technology, these difficulties can be overcome. By using a program, such as program 700 shown in FIG. 17, a precise AC waveform is generated for the welding operation and correlated specifically to a given cored electrode. A precise profile or shape for the AC waveform coordinated with a given cored electrode optimizes the welding operation. It is now possible to use an AC welding operation with a waveform accurately profiled to accommodate a specific cored electrode. AC welding using a cored electrode is facilitated by the technology disclosed in FIGS. 17-27.

Figure 21:
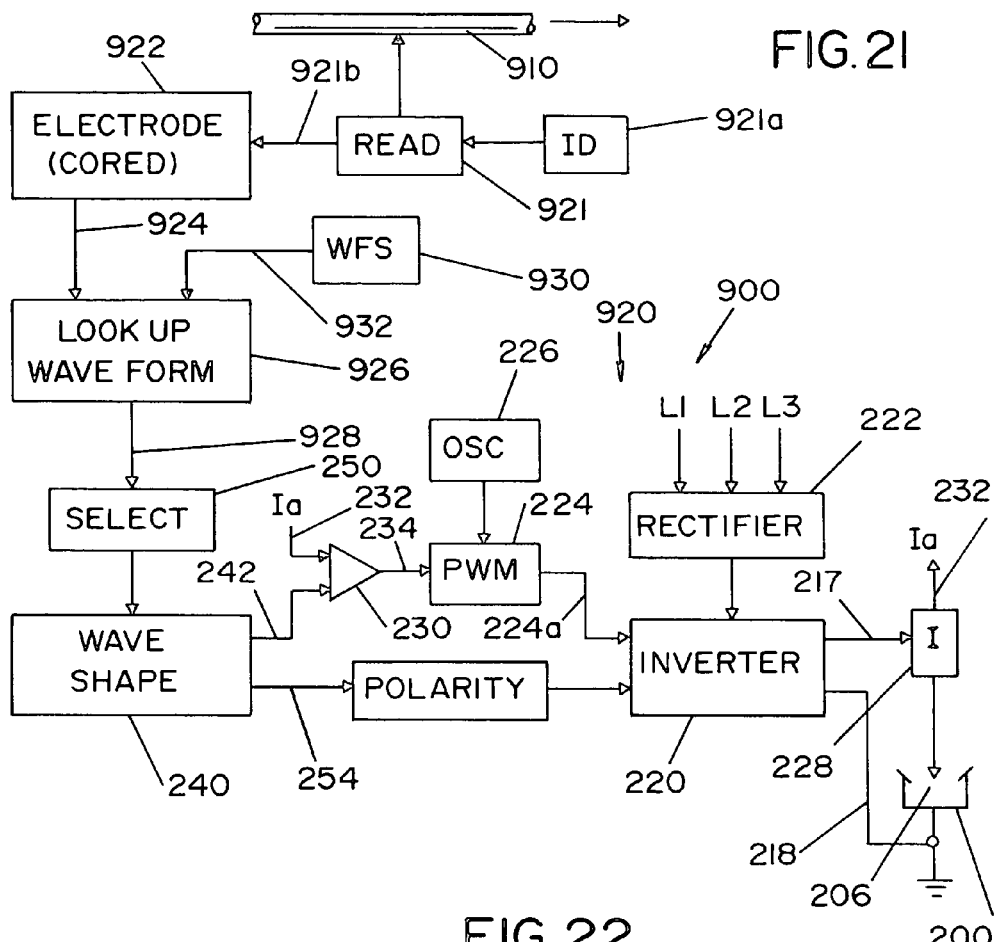
FIG. 21 is a block diagram disclosing a preferred system to implement the present invention.

Welder 900 is constructed in accordance with the present invention for performing an AC welding operation using a cored electrode so the welding operation is optimized for the particular electrode. Details of welder 900 are shown in FIG. 21 where power source 920 is driven by rectifier 920a. Electrode 910 is a cored electrode with sheath 912 and core 914. Power source 920 of welder 900 has a storage device, unit or circuit 922 to create an electrode identification signal in line 924 to identify a particular electrode 910 being used in the welding process. Reading device 921 identifies the particular electrode 910 passing by the reading device as indicated at the top of FIG. 21. Thus, the signal in line 924 identifies electrode 910. Device 921a manually tells reading device 921 which particular electrode 910 is being used. In other words, reading device 921 is set to the particular cored electrode 910 to be used in the welding operation. This device is manually adjusted to indicate a specific electrode. Electrode 910 can be identified by storage device 922 by a bar code or other reading technique. The bar code is located on the spool or drum containing electrode wire 910. In other words, device 921 either automatically senses the identification of wire or electrode 910 or receives manual input to indicate the electrode as indicated by block 921a. A signal in 921b is directed to storage device 922 where a signal in data form is stored for all electrodes to be used by welder 900. The signal on line 921b addresses a particular data in storage device 922 corresponding with the specific cored electrode. This data causes a profile signal to be applied to line 924. This signal activates waveform look up device 926 so the device outputs a profile signal in line 928. This signal instructs select circuit 250 to select a particular stored profile which has been created by program 700 for a particular cored electrode. Program 700 shown in FIG. 17 tailors the stored waveforms to a specific electrode. The remainder of power source 920 has been previously described. The profile signal in line 928 selects a specific constructed or created AC waveform stored in a memory associated with circuit 250. An AC welding waveform tailored to the particular construction and constituents of a particular cored electrode 910 is outputted in line 242. In accordance with an alternative, the particular signal in line 928 is determined by the electrode and the wire feed speed. Device 930 has a set point that is outputted in line 932. Consequently, the logic or data on lines 924 and 932 determine the profile select signal in line 928. A desired stored profile in the memory of waveform generator 250 is used. This profile is based upon the particular electrode and/or the particular set point wire feed speed.

Figure 22:
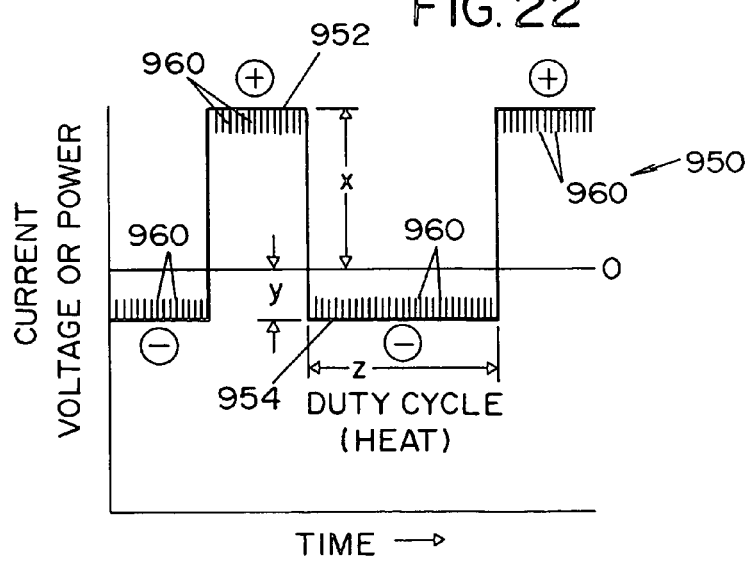
FIG. 22 is a graph of the current, voltage or power curve showing the AC waveform used in the welding process when implementing the system as shown in FIG. 21.

A typical constructed AC waveform is illustrated in FIG. 22 where process curve 950 includes a series of waveforms comprising positive section 952 and negative section 954. The waveforms are created by a large number of individual pulses 960 created at a rate substantially greater than 18 kHz and created at the output line 224a of pulse width modulator 224. This controls the high switching speed inverter. Curve 950 has a positive magnitude x and a negative magnitude y with the length of the negative portion 954 indicated to be z. In order to control the heat in the welding operation, duty cycle or wave balance z is adjusted when the AC waveform shown in FIG. 22 is constructed for a particular cored electrode. The negative portion 954 of curve 950 in FIG. 22 controls the overall heat input to the workpiece. The positive portion 952 contributes more heat to the electrode and less heat to the workpiece. Therefore, by changing the duty cycle or wave balance, the overall heat into the workpiece can be varied or controlled. An AC welding process is created at the output of wave shaper or waveform generator 240. The selected waveform is precisely adjusted to optimize its use with a particular cored electrode 910. To control the heat in the welding operation, the waveform has duty cycle of z controlled by program 700. After the AC waveform has been fixed, it is set into waveform generator 240 based upon the logic from select circuit 250. Welder 900 is used to correlate a particular AC waveform with a particular cored electrode to fix the operation of the welding process dictated by the constituents forming electrode 910.

Figure 23:
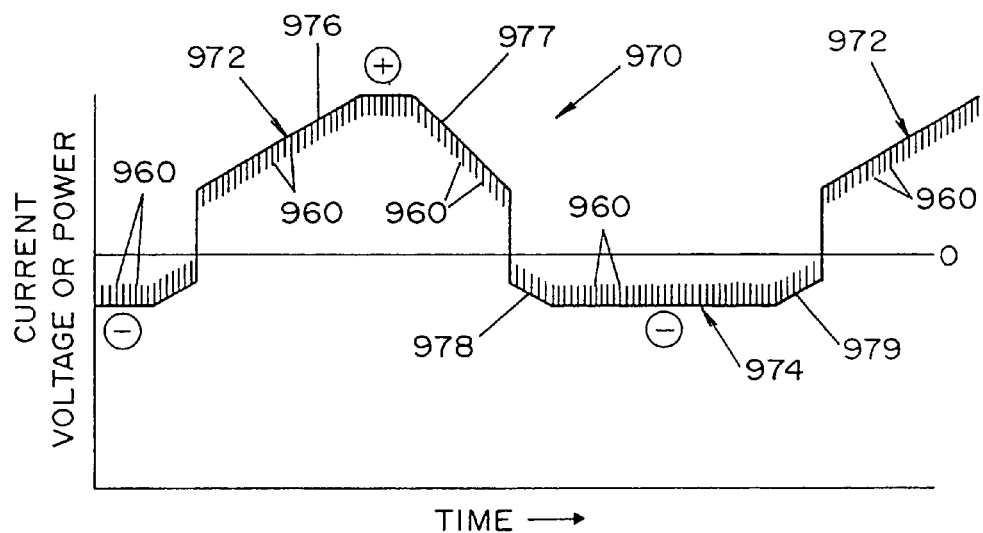
FIG. 23 is a graph similar to the graph of FIG. 22 illustrating certain modifications in the created AC waveform for a given cored electrode and capable of being obtained to practice the preferred embodiment of the present invention shown in FIGS. 28-45.

The AC waveform is preferably a square waveform, as shown in FIG. 22; however, to control the initial heating it is within capability of welder 900 to provide a non-square AC waveform shown in FIG. 23 wherein process curve 970 comprises waveforms, each having positive portion 972 and negative portion 974. Each of these portions is formed by a plurality of individual pulses 960, as explained with respect to curve 950 in FIG. 22. These individual pulses 960 are created at a frequency greater than 18 kHz and are waveform technology pulses normally used in inverter type power sources and described in the general technology section involving FIGS. 1-16. To reduce the rate of heating, portions 972, 974 are provided with ramp portions 976, 977, 978 and 979. Other profiles are possible to optimize the AC welding with a cored electrode.

Figure 24:
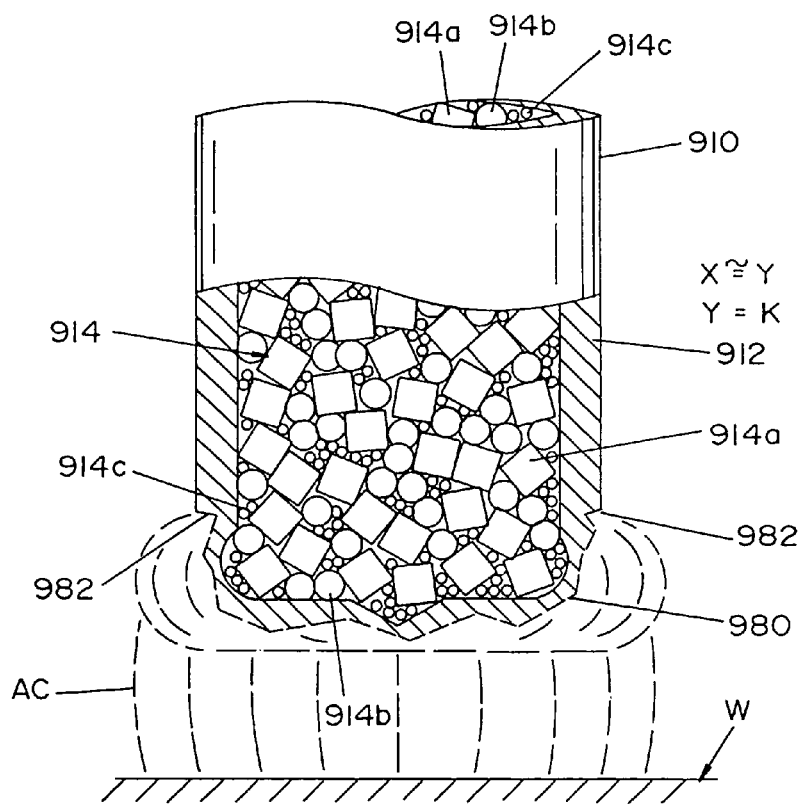
FIG. 24 is an enlarged, schematic view representing a cored electrode where the sheath and core are melted at a different rate.
Figure 25:
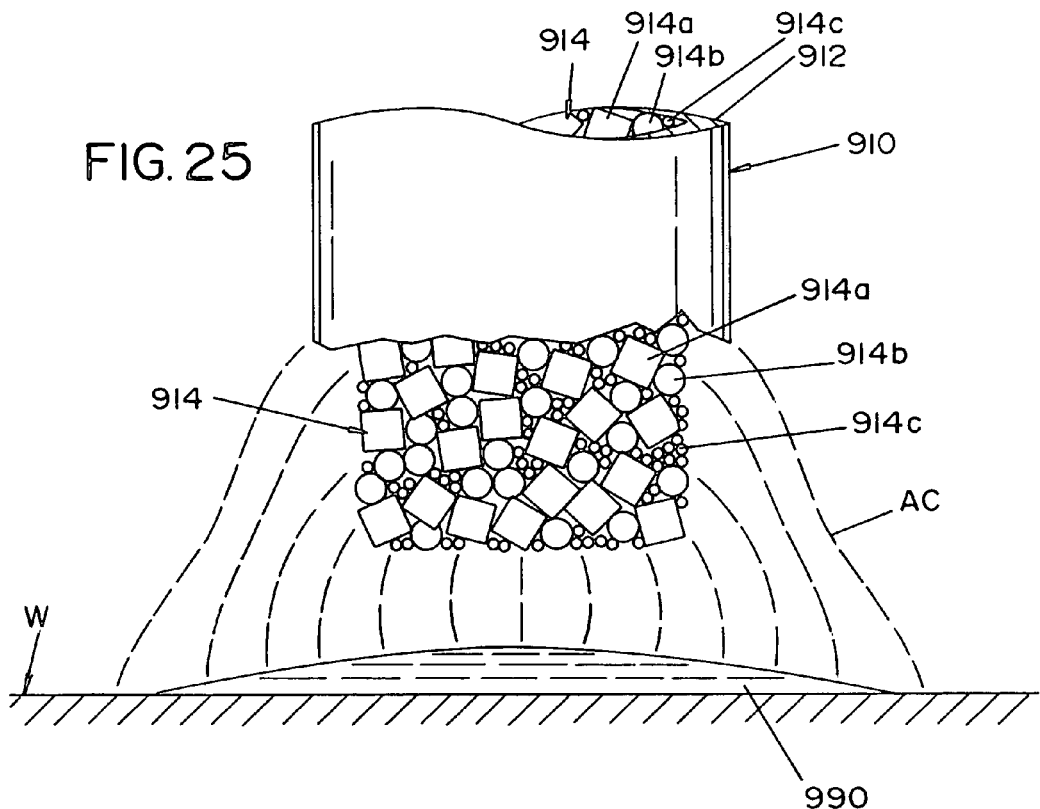
FIG. 25 is a view similar to FIG. 24 illustrating the disadvantage of a failure to employ a tailored waveform for welding with cored electrodes.

A common problem caused when using cored electrodes without control of the profile is illustrated in FIG. 24. The welding process melts sheath 912 to provide a portion of molten metal 980 melted upwardly around the electrode, as indicated by melted upper end 982. Thus, the sheath of the electrode is melted more rapidly than the core. This causes a molten metal material to exist at the output end of electrode 910 without protective gas or chemical reaction created by melting of the internal constituents of core 914. Thus, arc AC melts the metal of electrode 910 in an unprotected atmosphere. The necessary shielding for the molten metal is formed when the sheath and core are melted at the same rate. The problem of melting the molten metal more rapidly than the core is further indicated by the pictorial representation of FIG. 25. Molten metal 990 from sheath 912 has already joined workpiece W before the core has had an opportunity to be melted. It can not provide the necessary shielding for the welding process. FIGS. 24 and 25 show the reason why AC welding using cored electrodes has not been used for offshore pipeline welding and other pipeline welding. An AC waveform as described above controls the heat input when using a cored electrode.

By controlling the precise profile for the AC waveform used in the welding process, sheath 912 and core 914 can be made to melt at approximately the same rate. The failure to adequately coordinate the melting of the shield with the melting of the core is one reason for rejecting the use of AC welding with cored electrodes. The advantage of controlling the profile of the AC waveform is creation of a process not needing external shielding gas. When this occurs, shielding gas SG and other shielding constituents are generated ahead of the molten metal from sheath 912. This feature can be obtained by precisely profiling the waveform for the welding operation using program 700. In the past such coordination was not possible. Program 700 or like programs generate AC waveforms which are specifically tailored for individual cored electrodes allowing cored electrodes to be used in an AC welding process in a manner to protect the molten metal against atmospheric contamination during the welding operation.

Figure 26:
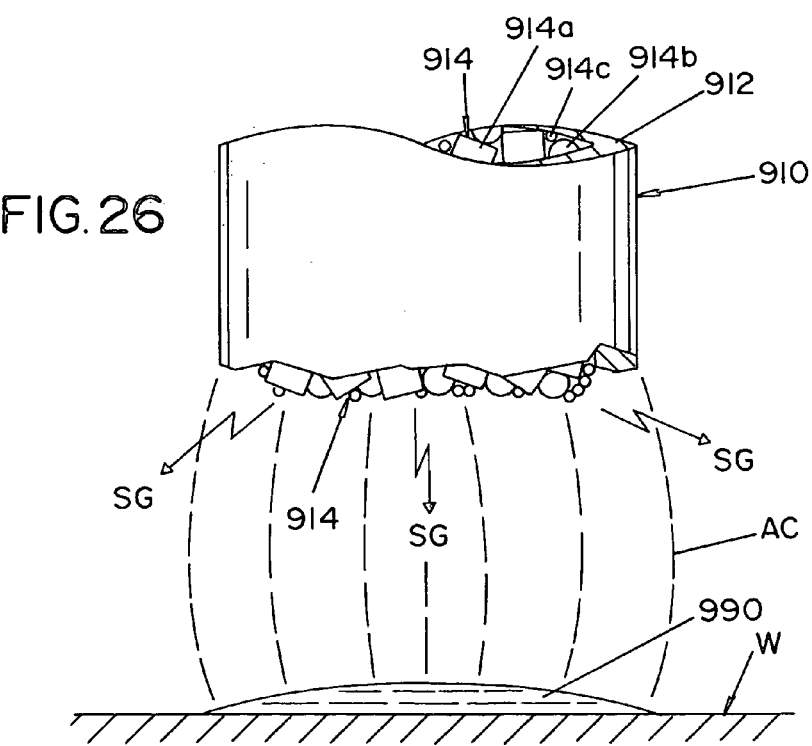
FIG. 26 is a view similar to FIGS. 24 and 25 showing the operation of a welding process using the background system as illustrated in FIG. 21; and, FIG. 27 is a block diagram showing a welder similar to the welder shown in FIG. 21 using a modification of the background system where a fixed cored electrode activates a given waveform to be outputted from the waveform generator.

When welding with a cored electrode, it is desired to have the sheath and core melt at the same rate. This operation promotes homogeneous mixing of certain core materials with the outer sheath, such that the mixture of molten materials chemically resists the effects of atmospheric contamination. Alloying elements required to produce desired weld metal mechanical and metallurgical characteristics are uniformly distributed in the weld metal. In addition, the protective benefits derived from slag and/or gas-forming constituents are optimized. This situation is illustrated in FIG. 26. In contrast, FIG. 25 illustrates a situation where the sheath has melted more rapidly than the core. Molten metal 990 from sheath 912 has already joined workpiece W before core 914 has had an opportunity to be melted. Metal 990 has not been protected from the effects of atmospheric contamination to the degree that it would have been if the unmelted core constituents had actually been melted. Additionally, alloying elements needed to achieve desired mechanical and metallurgical characteristics may be missing from molten metal 990.

Figure 27:
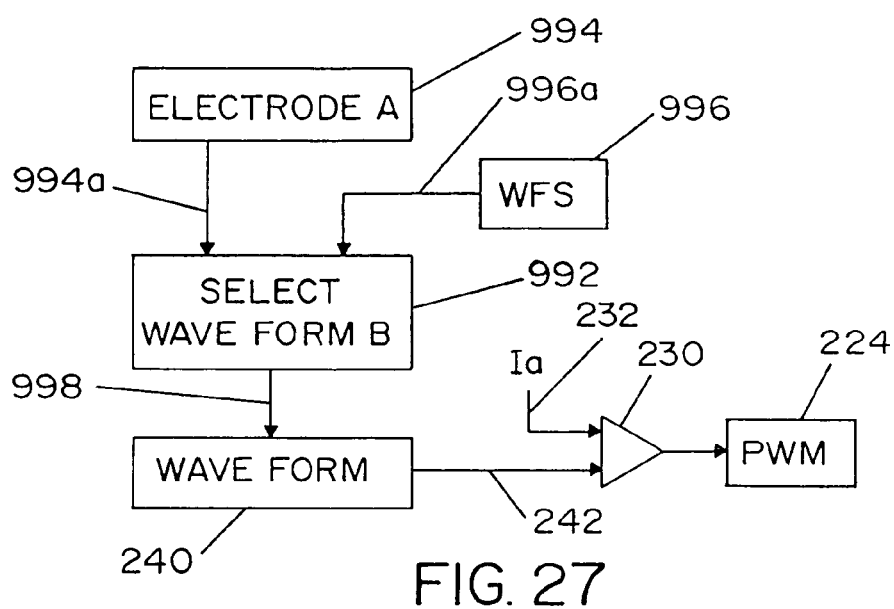

An alternative process is shown in FIG. 27 where select circuit 992 selects a waveform B in accordance with the data in line 994a from block 994. This block has data identifying a particular electrode A. The electrode has a composition that is accommodated by waveform B in select circuit 992. A set point in line 996a from wire feed speed block 996 is used to select waveform B so that waveform B is not only a waveform for the electrode but for electrode A with a particular set point. This adjusts the output of waveform generator 240 to control the waveform of the AC welding process to be tailored to the exact cored electrode A identified by block 994. Electrode A is used to activate waveform B. A waveform is created to perform the desired operation when using a particular cored electrode. By identifying the particular cored electrode and activating its coordinated AC waveform, the desired welding process is performed between the electrode and the workpiece. The constituents of the core and the size of the sheath determines the optimum waveform profile used in the AC welding process. This is made possible by the use of a program such as program 700 in FIG. 17 to precisely set and modify the profile of the waveform being used in an electric arc welding process of the type using waveform technology.

FIGS. 17-27 show how the waveform technology of FIGS. 1-16 can be used to use AC welding or cored electrodes. Having developed this capability, the novel welding method of the present invention disclosed in FIGS. 28-45 is made possible.

The Invention

FIGS. 28-45

Figure 28:
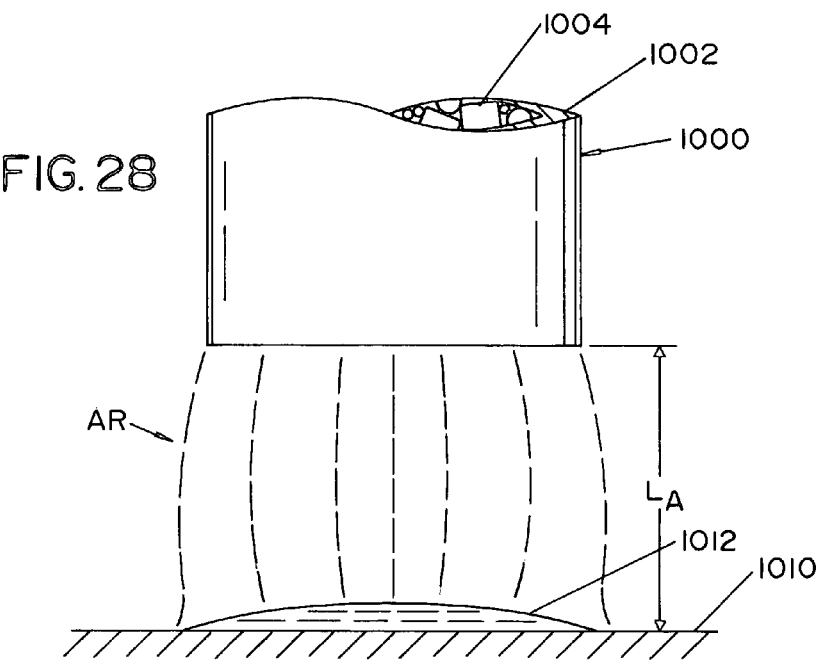
FIG. 28 is a partial, side elevational view illustrating a cored electrode as used in the present invention and showing the arc length, which length is minimized by use of the present invention.

As indicated in the previous sections, an electric welder of the type using waveform technology can be used for AC welding using a cored electrode, such as electrode 1000 shown in FIG. 28. Such electrode includes an outer steel sheath 1002 surrounding core 1004 formed of particulate material, including alloying metals and slag or flux materials. By having internal flux or slag materials, there is no need for external shielding gas during the welding operation. By including alloying material in core 1004, the puddle of weld metal 1012 on workpiece 1010 can be modified to have exact alloy constituents. This is a substantial advantage and reason for using cored electrodes, instead of solid welding wire where alloying must be accomplished by the actual constituent of the welding wire. Adjustment of alloying for the weld metal is quite difficult when using solid welding wire; therefore, it is extremely advantageous in high quality welding to employ a cored electrode, as discussed in the previous section. Arc AR melts sheath 1002 and melts constituents or fill in core 1004 at a rate which can be controlled to be essentially the same. Contamination in weld metal 1012, such as hydrogen, nitrogen and oxygen can cause porosity problems, cracking and other types of physical defects in the weld metal. Thus, it is a challenge to design the welding process to exclude contaminates from the molten weld metal. It is common to use "killing" agents, typically silicon, aluminum, titanium and/or zirconium which will combine chemically with potential contaminates to prevent them from forming porosity or harmful inclusions in the weld metal. Furthermore, "scavengers" may also be added to react with hydrogen containing a species in order to remove hydrogen from the weld. In order to deposit consistently sound weld metal 1012, it has often been necessary to add such killing agents in quantities that are themselves detrimental to properties of the weld metal, such as ductility and low temperature toughness. Thus, it is desirable to reduce the exposure of the molten metal in arc AR to prevent contamination of the metal passing from electrode 1000 to workpiece 1010 so the killing agents can be minimized. The present invention is the use of AC welding for cored electrode 1000 where the positive and negative shapes of the AC waveform are modified to reduce the overall arc length $L_A$. In this manner, there is less exposure to the atmosphere and less time during which the metal is molten. Indeed, by reducing the arc length, the temperature of the molten metal can be reduced as it travels from the electrode to weld metal puddle 1012. Only by using a welder that can perform an AC welding process with different shapes for the negative and positive sections, can AC welding with cored electrodes be used effectively in the field. As explained in the previous section, parameters of the positive and negative portions of the alternating waveform can be independently adjusted to compensate for and optimize the melting of both sheath 1002 and cored 1004 for selected electrode 1000. The present invention relates to a further improvement in a welder and method for AC welding with cored electrodes wherein the shape of the positive and negative portions are independently controlled. The technique of the waveform control in accordance with the invention allows a reduced arc length $L_A$ while still maintaining arc stability. Thus, a welder for performing an AC welding process with cored electrodes is modified in accordance with the invention to perform a specific method heretofore not known or used in the electric arc welding field.

Figure 29:
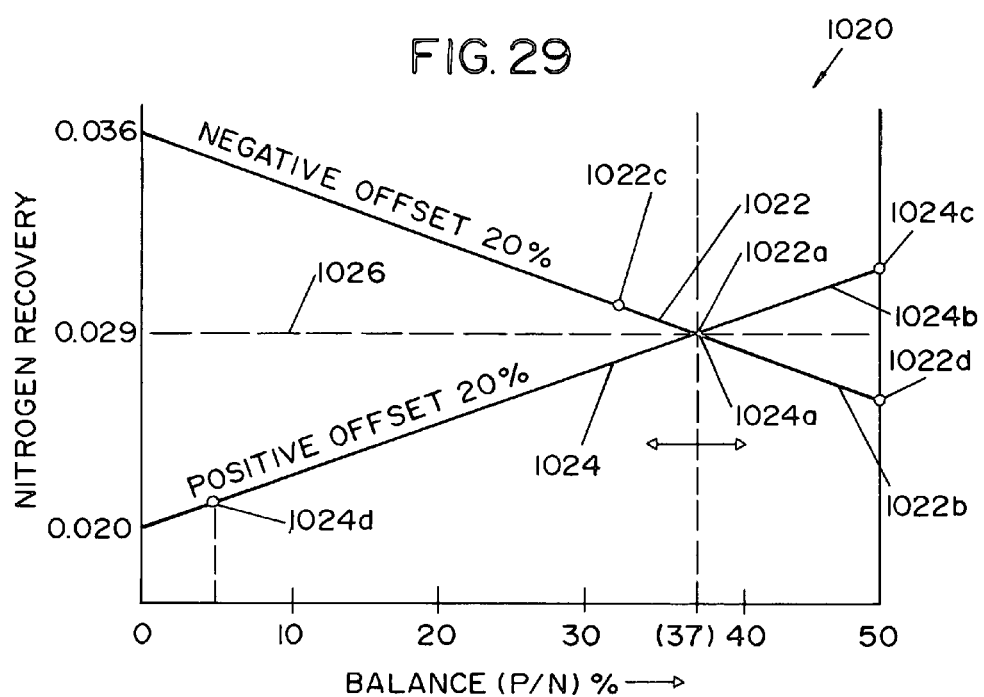
FIG. 29 is a graph showing the nitrogen recovery obtained by using the two separate modes of practicing the present invention.

The basic features of the improved electric arc welding process is illustrated by graph 1020 shown in FIG. 29. This graph exhibits the results of a series of test welds made with a self shielded flux cored electrode having a diameter of 0.062 inches. The particular flux cored electrode was Lincoln Innershield NR-233. Welds were made at a constant wire feed speed and travel speed. The power source was operated in AC with a frequency of about 60 Hz to lay three passes or beads side-by-side. Then two passes of side-by-side beads were laid in a second layer on top of the first three passes or beads. The plate surfaces were shot blasted prior to welding to remove scale and contaminants. The weld metal in the second layer was analyzed for nitrogen content, which is one of the contaminates that needs to be excluded for quality welding using a flux cored electrode. Since no nitrogen is intentionally incorporated in the NR-233 electrode, it was assumed that the nitrogen in the weld metal was contaminants from the ambient atmosphere. The power source for conducting these welding operations was a source especially constructed to produce alternating current with variable waveforms, such as a Power Wave sold by The Lincoln Electric Company of Cleveland, Ohio. Two characteristics of the AC waveform were modified to produce the results shown in graph 1020. For the first test, a −DC offset of 20% was created so the voltage of the positive section was 20% less than the voltage of the negative section. In the test, the negative voltage was 23 volts, the positive voltage was 18 volts. Curve 1022 was created by periodically changing the wave balance from 0 to 50%. Wave balance is the ratio of the positive portion of the AC waveform to the period of the AC waveform. At 50% wave balance, the positive and negative sections of the AC waveform are the same. The nitrogen recovery was measured for various values of wave balance. This produced a generally statistical line for curve 1022 which line extends generally from an unacceptable nitrogen level of 0.036 downwardly to point 1022a having a nitrogen recovery of 0.029. Curve 1022 extends downward for reduced nitrogen recovery, as indicated by section 1022b. A second set of tests were conducted with the +DC offset of 20% whereby the negative section of the AC waveform is 20% less than the positive section. This test produced curve 1024 which extends generally from a nitrogen recovery of 0.020 upwardly to point 1024a corresponding to point 1022a of curve 1022. Thereafter, the amount of nitrogen recovery increases as indicated by section 1024b of curve 1024. Curves 1022 and 1024 intersect at points 1022a, 1024a at a nitrogen recovery level identified by dashed line 1026. Curves 1022 and 1024 of graph 1020 are representative in nature illustrating the type of slope for a −DC offset AC waveform and a +DC offset AC waveform, as the waveforms vary with respect to the amount of wave balance. It has been found by tests that +DC offset has a low contaminant level at a low wave balance. In a like manner, −DC offset of the AC waveform has a low contaminate level at higher levels of wave balance. This finding is the basis of the modification of the waveform to reduce contamination when using AC welding for cored electrodes. When using a negative offset, the wave balance should be greater than about 30%, as indicated by point 1022c. When a positive offset is used, the wave balance should be less than about 50% as indicated by point 1024C. In all instances, the wave balance must be at a level to assure that there is enough voltage RMS for an arc by using the present invention. This low level intersects line 1024 at point 1024d where the wave balance is about 5%. This level creates a corresponding low point 1022d by continuation of 1022. Point 1022d is the intersection of the same low level line through point 1024d with line 1022. Thus, the test represented by curve 1020 defines a method of controlling the AC waveform by adjusting offset and wave balance to produce low arc length and, thus, reduced atmospheric contamination. The tests were conducted at 60 Hz; however, they have also been done between 30-120 Hz.

Figure 30:
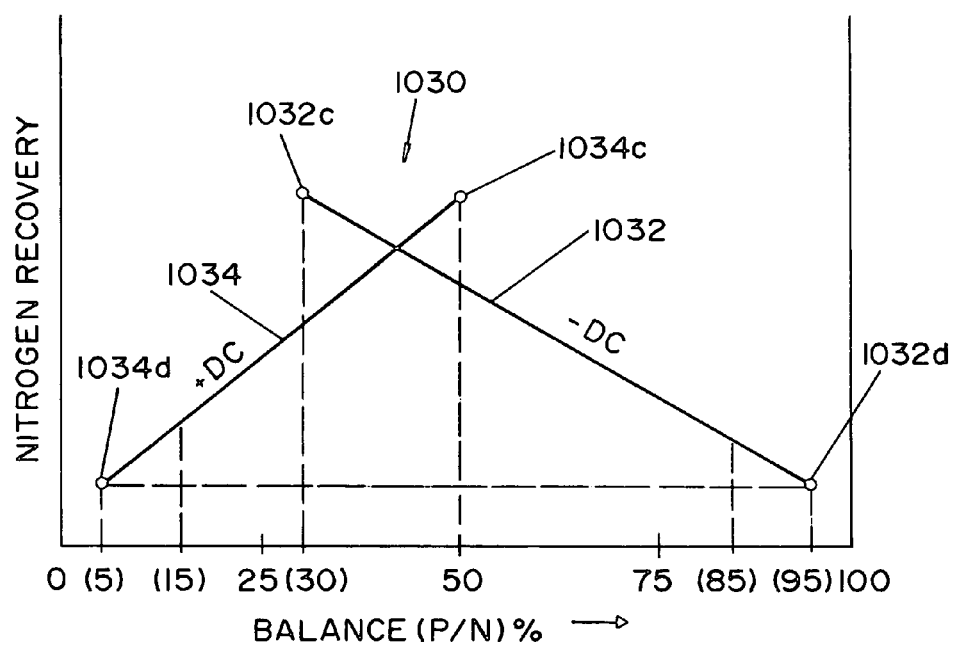
FIG. 30 is a graph, similar to the graph of FIG. 29, illustrating the implementation of the present invention over the total wave balance of an AC waveform.

FIG. 30 shows curve 1030 with a negative offset curve 1032 and a positive offset curve 1034. This is obtained from the test results presented in FIG. 29 wherein curve 1032 provides an operative range between points 1032c and 1032d. In this manner, with a −DC offset, the AC waveform has a balance between about 30% and 95%. The +DC offset waveform has a wave balance between 5% and 50%. Although the two modes of operation in accordance with the invention as shown in FIG. 30 have ranges between the two spaced points, preferably the positive offset waveform has a wave balance between about 5 and 15%. The negative offset waveform has a wave balance between 85 and 95%. These methods produce low contamination and are the preferred implementation of the present invention. Graph 1030 of FIG. 30 is illustrative of the present invention, wherein an AC waveform is used with a low wave balance +DC offset and high wave balance for −DC offset. The preferred implementation is with the use of a +DC offset waveform.

Figure 31:
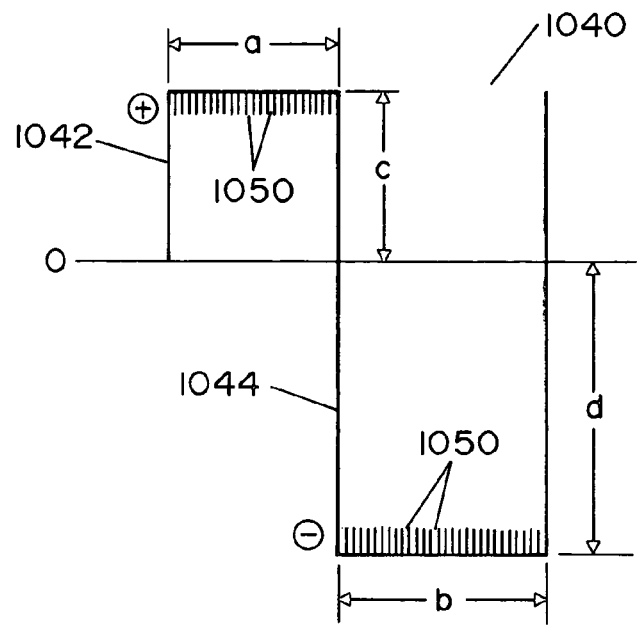
FIG. 31 is an AC voltage or current waveform having parameters, which parameters are adjusted in practicing the present invention.
Figure 32:
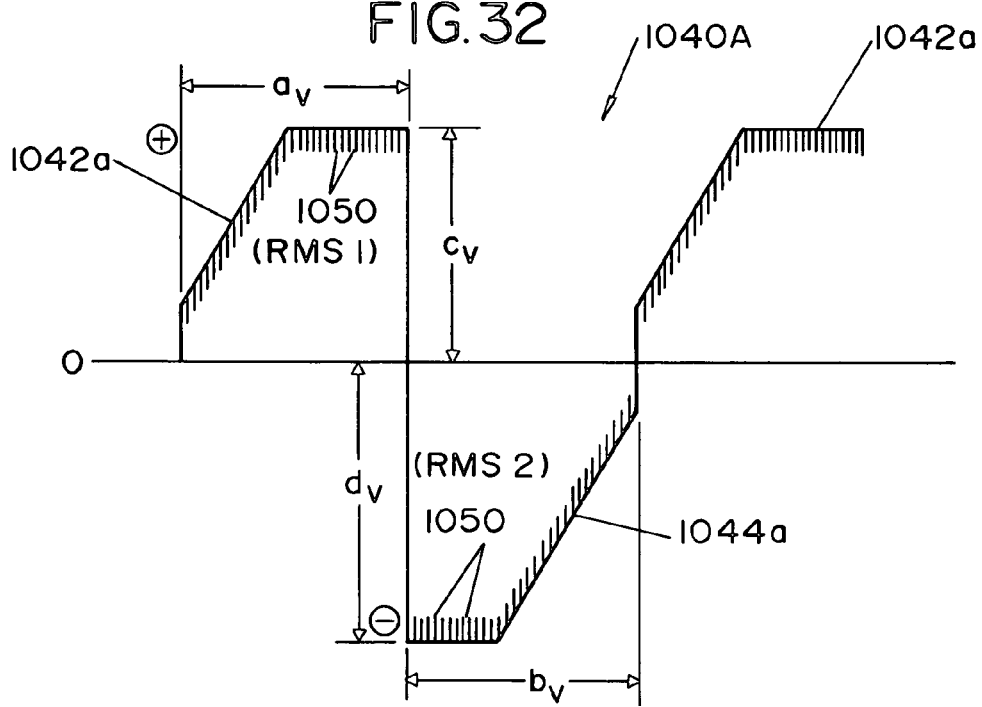
FIG. 32 is a waveform similar to the waveform of FIG. 30, with additional modifications possible when using the present invention.

FIGS. 31 and 32 show AC waveform 1040 and AC waveform 1040A. Each of the waveforms are constructed by a series of voltage or current pulses 1050 in accordance with waveform technology, preferably employed in practicing the present invention. Waveform technology utilizes a pulse width modulator controlled by a waveform generator or wave shaper so that the actual profile of the positive sections 1042, 1042a and the negative sections 1044, 1044a can be profiled to a particular shape. In FIG. 31 the tailored shape is a square wave, which is the preferred implementation of the present invention; however, the invention can also be performed by a shape which is not a square wave, as shown in FIG. 32. In both AC waveforms, the positive section has an RMS illustrated to be RMS1 and the negative section has an RMS indicated to be RMS2. In accordance with the invention the offset involves the RMS of one section being greater than the RMS of the other section, which difference has been previously defined as offset. As shown in FIG. 32 waveform 1040a can be tailored made to any particular cored electrode. However, the present invention involves the broad concept of coordinating offset with wave balance to accomplish the desired relationship of the RMS between the positive and negative sections of the AC waveform used in the AC welding operation for cored electrode 1000, as shown in FIG. 28. The preferred waveforms for practicing the present invention are illustrated in FIGS. 33 and 34 using the same waveform technology as disclosed in FIGS. 31, 32. In the preferred implementation of the present invention a positive offset waveform 1100 has a positive section 1102 with the voltage $V_a$ to produce an AC waveform, negative section 1104 has a voltage with a magnitude in the range of 0.75-0.90 $V_a$. The high voltage spike positive section 1102 is approximately 5-15% of the time of the total waveform. This is the relationship between the short positive time 1110 and the long negative time 1112. Waveform 1100 is preferably a voltage waveform, but it can be a current waveform. The voltage during the negative section is not sufficient to maintain the arc stability; however, the periodic high voltage spike 1102 maintains the arc. Thus, waveform 1100 has a low RMS by having a major portion of the waveform at a low voltage and merely employs periodic spikes in the opposite polarity. The same general concept is illustrated in FIG. 34 wherein waveform 1120 is a −DC offset waveform, with a high voltage negative portion 1122 and a lower voltage positive portion 1124. The RMS during the major portion of waveform 1120 is controlled by the negative section of the AC waveform; however, stability is maintained by the high voltage negative section 1122. The relative times of the high voltage and low voltage section of the AC waveform is set forth as times 1130 and 1132, which times have the same relationship as corresponding times in waveform 1100 of FIG. 33. Even though the invention anticipates use between the two spaced points shown in FIG. 30 as points 1032c, 1032d and points 1034c and 1034d, the relationships set forth in FIGS. 33 and 34 are the preferred implementation. The first mode of operation is a +DC offset, with a low wave balance in the general range of 5-15% and the second mode of operation is a −DC offset with a waveform balance in the general range of 85-95%. Both waveform 1100 and 1120 are AC waveforms having adjustable offset and adjustable wave balance, which are accomplished by use of a welder using waveform technology of the type pioneered by The Lincoln Electric Company. Of course, other technologies could be used for practicing the invention as set forth generally in FIG. 30 and in FIGS. 33 and 34. In practice, the frequency of the waveforms 1100 and 1120 are in the general range of 30-120 Hz.

Figure 35:
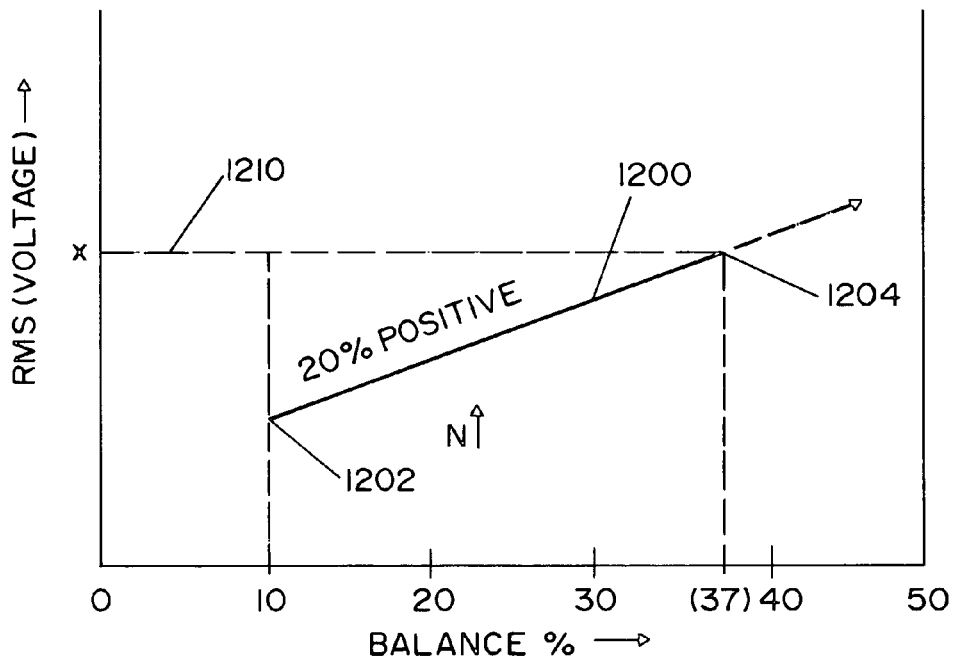
FIG. 35 is a graph illustrating the mode of operation for +DC offset, as it relates to RMS in accordance with balance.
Figure 36:
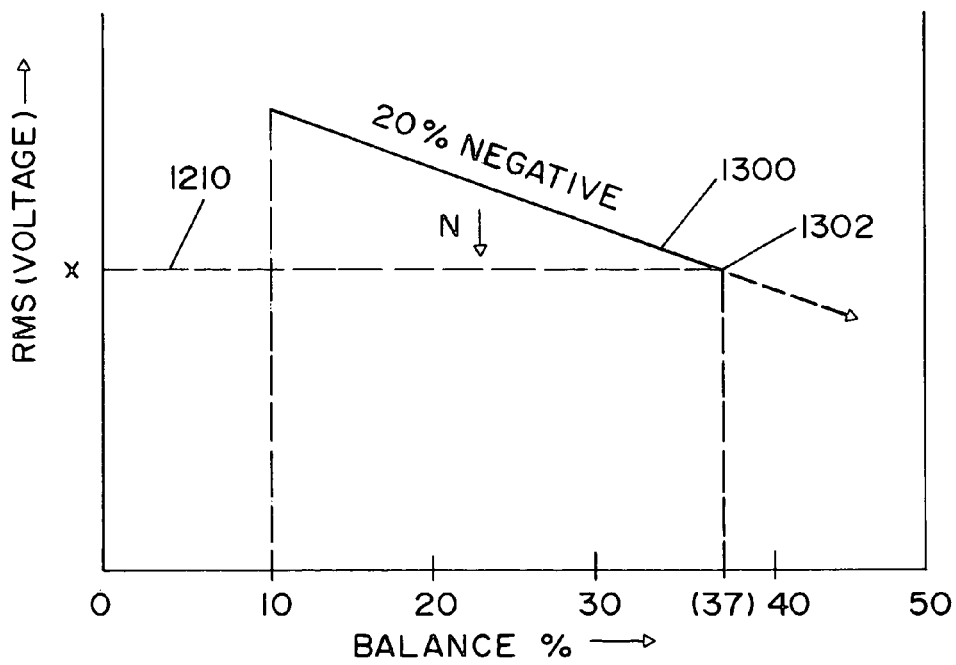
FIG. 36 is a graph, similar to the graph in FIG. 37, illustrating the operation of the preferred embodiment using the −DC offset mode.

One feature of the present invention is changing the wave balance when there is a substantial difference between the magnitudes of the positive section and the negative section of the AC waveform. In this manner, the wave balance can be used to adjust the voltage RMS of the AC waveform to reduce the voltage RMS of the AC waveform to a value where the arc length is relatively small. This is true if the waveform is voltage, but the voltage RMS can be controlled with a current waveform. In accomplishing this objective the DC offset, as discussed in FIGS. 29 and 30, preferably has a value between about 10-30. In other words, the smaller or lesser magnitude section of the AC waveform used for the actual welding operation is about 10-30% less than the higher magnitude of the short high voltage section used to stabilize the arc. By adjusting the wave balance, the voltage RMS of the AC waveform can be reduced. This is illustrated in FIGS. 35 and 36 wherein a positive offset curve 1200 operates in accordance with the present invention between point 1202 and point 1204 which point corresponds to an x value for the voltage RMS. This value is represented by line 1210. In the broad sense, the present invention can be used where positive offset curve 1200 exceeding 37%; however, in the test conducted to produce graph 1020 of FIG. 29, the desired voltage RMS for the −20 DC offset was obtained at 37% wave balance. In a like manner, the negative curve 1300 reached point 1302 at RMS level 1210 at about 37%. The representations of FIGS. 35 and 36 merely illustrated that the present invention is used to control the voltage RMS of the AC waveform by having a DC offset generally in the range of 10-20 and by adjusting the wave balance. The wave balance and offset produces negative and positive sections of the waveform which are independently adjusted to accomplish the objectives of the invention. This waveform is illustrated as a voltage waveform created by a wave shaper or waveform generator; however, the waveform can be created as a current waveform obtained by the same technology.

Figure 37:
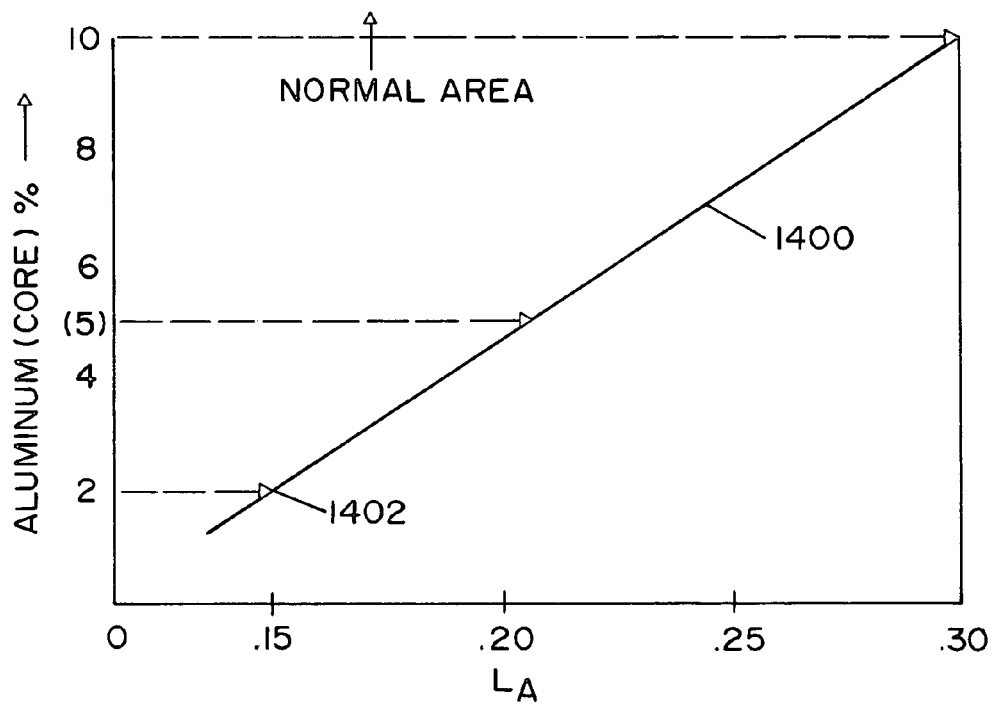
FIG. 37 is a graph of the aluminum in the core of the electrode as it is reduced by the use of the present invention.
Figure 38:
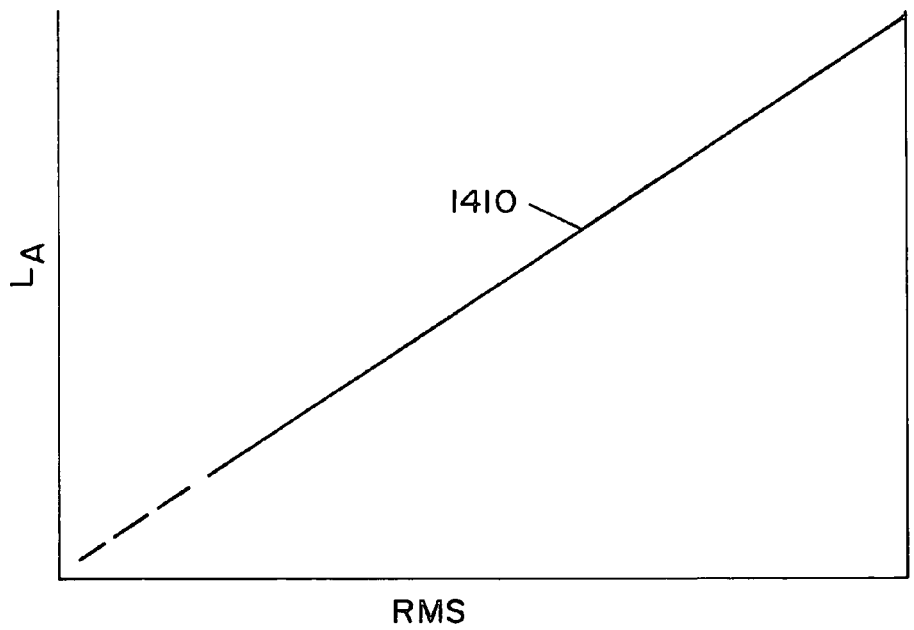
FIG. 38 is a graph generally illustrating the direct relationship between arc length and RMS.

An advantage of the invention is the ability to reduce the arc length using an AC waveform for welding with a cored electrode. In the past, electrodes often included over 10% aluminum as an alloying agent to kill the nitrogen contamination during the welding operation. By using the present invention, the RMS is reduced which reduces arc length $L_A$ to thereby decrease the desired amount of "killing" agent, such as aluminum. This concept is schematically illustrated in FIGS. 37 and 38 wherein curve 1400 illustrates the needed "killing" agent or aluminum in the core of the electrode as the percentage is correlated to arc length. As the arc length is reduced, the needed or required aluminum is also reduced because of less exposure of the molten metal in the arc to atmosphere. In normal practice, aluminum is used in electrodes in an amount substantially over 10% of the fill. It has been found that by using the present invention, the arc length can be reduced to a level less than 1402, which level requires about 2% aluminum in the core fill. Curve 1400 is representative in nature and illustrates that as the arc length is reduced by using the present invention, the amount of aluminum is also reduced. The previous curves have been basically related to RMS; however, as curve 1410 in FIG. 38 reveals, voltage RMS and arc length have a direct relationship, although this relationship may not be exactly a straight line. Thus, the curves previously discussed with respect to voltage RMS apply equally to arc length.

Figure 39:
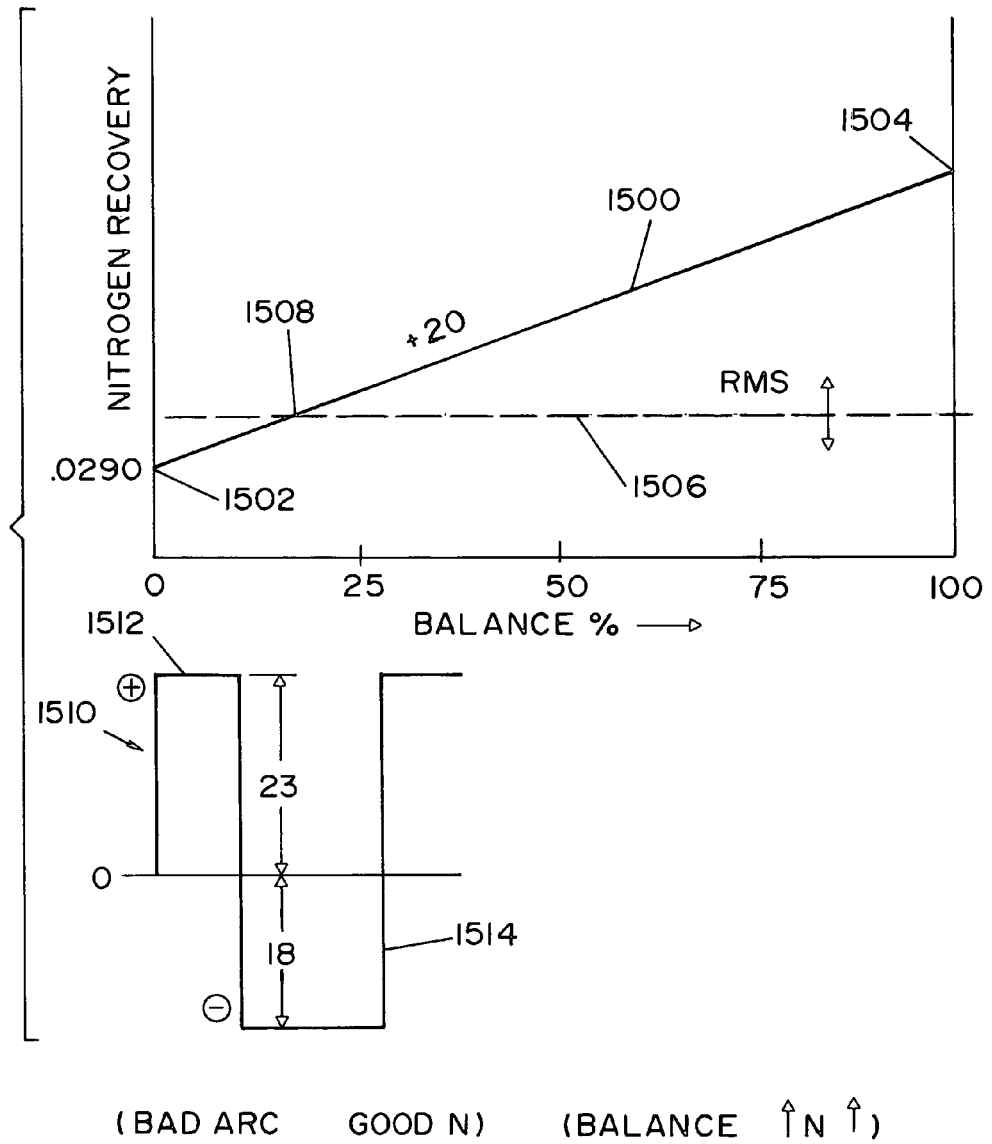
FIG. 39 is a graph and associated waveform to show the relationship of nitrogen recovery to balance for the +DC offset mode of operation of the invention.
Figure 40:
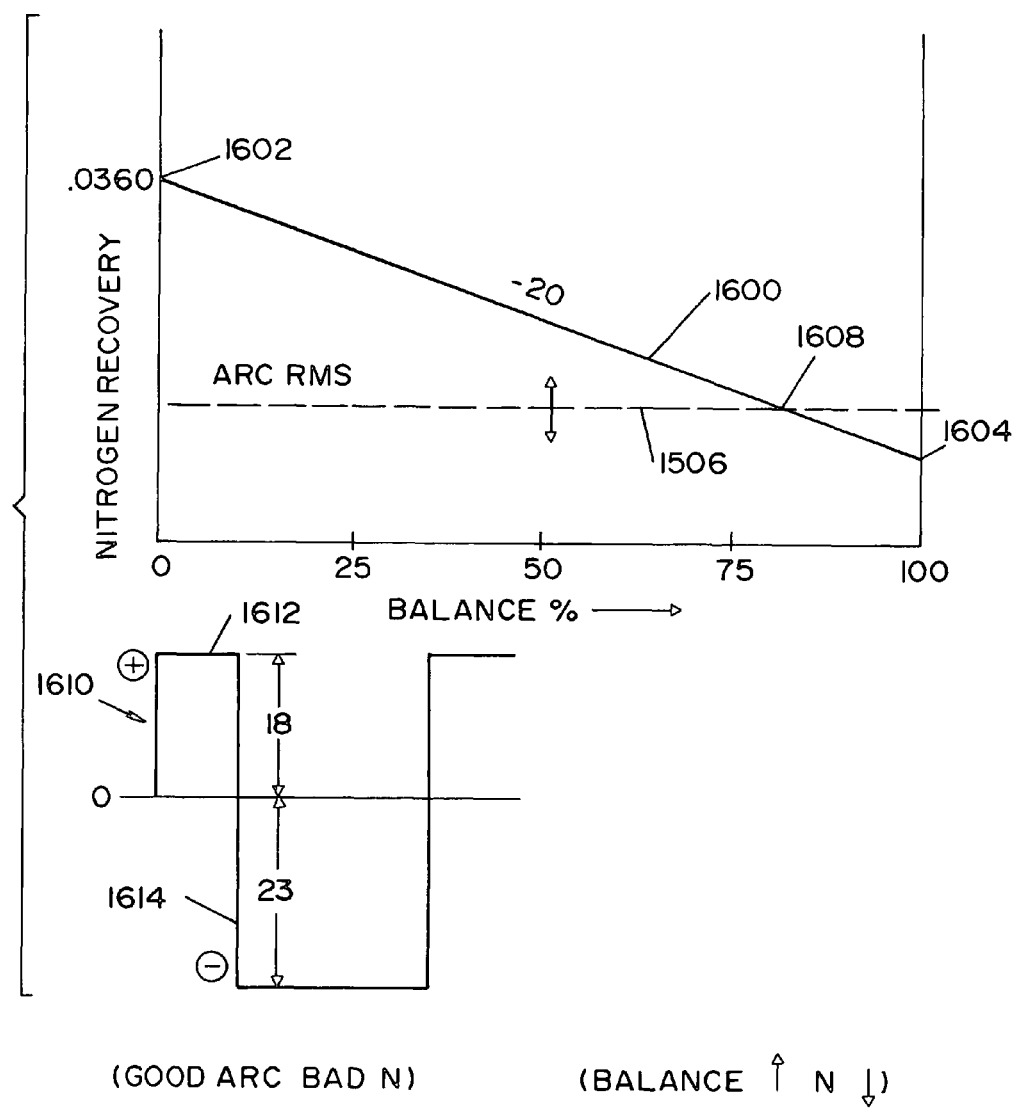
FIG. 40 is a combined figure, such as the graph and waveform shown in FIG. 39, showing the relationship between balance and nitrogen recovery when using the −DC offset mode of operation for the invention.

As a summary, FIG. 39 represents a mode of operation of the present invention when the nitrogen recovery is set forth by curve 1500 for a positive offset waveform 1510. The curve extends from a minimum nitrogen recovery at point 1502 to a maximum nitrogen recovery, as indicated by point 1504. In accordance with this mode of operation, the desired lower RMS is illustrated as dashed line 1506. This line is adjusted to the desired arc length of the welding operation to provide intersection point 1508, which point defines the wave balance of the AC welding process. The positive offset waveform 1510 includes a 23 volt positive section 1512 and an 18 volt negative section 1514, which difference in magnitude allows adjustment of the wave balance to provide the desired nitrogen recovery. Vertical shifting of the desired RMS causes line 1506 to intersect line 1500 at point 1508. Welding at DC− (zero wave balance) using a cored electrode will result in an unstable arc. This unstable situation is represented by point 1502. However, this operation point will produce very low nitrogen contamination. A positive section 1512 is created only as the wave balance increases from the zero value at point 1502. When this occurs, the balance increases and the nitrogen level also increases. Thus, the wave balance is preferably increased only a slight amount between about 5-15% when a positive offset waveform 1510 is used to practice the first mode of operation of the present invention. The second mode of operation is illustrated in FIG. 40 wherein curve 1600 is created by negative offset waveform 1610 having a low magnitude positive section 1612 and a high magnitude negative section 1614. Curve 1600 progresses from point 1602 at DC−, but with high voltage. Point 1602 creates a high nitrogen recovery because of the high negative voltage. Curve 1600 progresses from the unacceptable DC− operating point 1602 to point 1604 at a low nitrogen recovery. At point 1604 the welding operation is substantially DC+ at 18 volts. This also produces an unstable arc. The same is true of DC− which occurs at point 1502 with an unstable 18 volts. To provide the desired operation point 1608 on curve 1600, the RMS line 1506, as shown in FIG. 39, is adjusted to produce the intersection point 1608. This intersection identifies the desired wave balance for the second mode of operation, wherein a negative DC offset AC waveform is employed. FIGS. 39 and 40 illustrate two implementations of the present invention. A welder or controller can be shifted between the two modes of operation on either +DC offset or −DC offset.

By using a waveform technology power source, the wave balance of the present invention can be changed by changing the positive section of the waveform while maintaining the cycle length of the waveform constant. However, other changes in the shape of the waveform can be made to modify the effective wave balance. Representative wave balance concepts are schematically illustrated in FIGS. 41-43. AC waveform 1620 has positive section 1622 and negative section 1624 with a cycle length m. By moving the trailing edge 1626 of section 1622, the wave balance is adjusted. This is the standard technique. However, by using a waveform technology type electric arc welder, other arrangements can be used, one of which is shown in FIG. 42. AC waveform 1630 has a positive section 1632 and a negative section 1634. The wave balance can be adjusted by increasing negative section 1634 by movement outward of trailing edge 1636. Thus, the cycle length is now m+a and the wave balance is decreased as negative section 1634 is increased. In a like manner, AC waveform 1640 of FIG. 43 includes positive section 1642 and negative section 1644. The cycle length can be decreased to m-b by moving trailing edge 1646 of section 1644 to the left. Consequently, as shown in FIGS. 41-43 various adjustments can be made in the AC waveform to produce different shapes in the positive section and the negative section to modify the wave balance together with an adjustment of section magnitude, which changes the DC offset. Other adjustments of the AC waveform to change wave balance are within the skill of the art.

FIGS. 44 and 45 show two waveforms for the two operating modes of the invention. Waveform 1700 of FIG. 44 has a high magnitude positive section 1710 and a low magnitude negative section 1712. This is a +DC offset waveform used in the preferred embodiment where the waveform is coordinated with a low wave balance. In a like manner, −DC offset waveform 1720 of FIG. 45 has a low magnitude positive section 1722 and a high magnitude negative section 1724. This waveform is used for the mode of operation where a high balance is employed. These two waveforms are shown to represent the preferred operation of the present invention, as shown in FIG. 44 and the other mode of operation using a waveform as shown in FIG. 45. The preferred implementations of the present invention for both the positive and negative offset voltages are shown in FIGS. 44 and 45. In practice, the concept shown in FIG. 44 is used.

The invention involves AC welding wherein the positive and negative sections of the waveform are individually adjusted to accomplish the objective of a low arc length and reduce contamination. In using this method, novel slag or flux systems have been designed to be used with self shielding flux cored electrodes. These flux systems will use MnO, $SiO_2$, CaO and $BaF_2$ as secondary slag modifiers. The electrodes incorporating these new systems will be used without shielding gas and will rely on deoxidizing and denitriding agents in the core for additional protection from atmospheric contamination. The first novel slag system is set forth below where the percentages are the amount in the end product slag.

Example I

| Compound | % slag |
|---|---|
| $TiO_2$—$ZrO_2$—$Na_2O$—$Li_2O$—MgO | |
| $TiO_2$ | 5-35 |
| $ZrO_2$ | 5-35 |
| $Na_2O$ | 0-5 |
| $Li_2O$ | 0-5 |
| MgO | 15-45 |
| Secondary Slag Formers | |
| $BaF_2$ | 0-2 |
| CaO | 0-2 |
| $Fe_2O_3$ | 0-3 |
| Al | <5 |

This slag system mimics a FCAW-G slag system for a FCAW-S electrode. By using this slag system and the AC method of the present invention, the Aluminum is eliminated as a deoxidizer; therefore, sodium stabilizers can be used in the slag system.

The second novel slag system is set forth.

Example II

| Compound | % slag |
|---|---|
| $ZrO_2$—$Al_2O_3$—$Fe_2O_3$—MgO—$Li_2O$ | |
| $Al_2O_3$ | 10-35 |
| MgO | 10-40 |
| $Fe_2O_3$ | 5-20 |

| Compound | % slag |
|---|---|
| $ZrO_2$ | 0-20 |
| $Li_2O$ | 0-5 |
| Secondary Slag Formers | |
| $BaF_2$ | 0-5 |
| CaO | 0-2 |
| $TiO_2$ | 0-2 |
| Al | 10 |

$$Fe_2O_3 + 2Al \rightarrow Al_2O_3 + 2Fe$$

This second novel slag system attempts to control the level of aluminum in the weld metal and to actively control the level of aluminum oxide formation by using an iron oxide to promote a thermite reaction. By controlling the amount of aluminum in the weld metal, the microstructure is optimized to get acceptable mechanical properties. The iron oxide in this predominately oxide based slag system also assists in lowering the melting point of the molten metal. This makes the electrode suitable for welding out of position in the vertical-up direction.

Other slag systems can be used in practicing the invention; however, these two novel slag systems, Example I and Example II, have been tested and proved beneficial in an AC process for flux cored electrodes, where the DC offset and wave balance are controlled as previously described.

Various modifications can be made in the disclosed methods of AC welding with a cored electrode while using the concept of the present invention, with or without the use of one of the two novel slag systems.

Having thus defined the invention, the following is claimed:

1. A method of arc welding with a cored welding electrode, said method comprising:
   generating a welding waveform with a waveform period and a root mean square (RMS) level for maintaining a stable short welding arc based on at least said cored welding electrode, said welding waveform having a positive portion and a negative portion, wherein said positive portion has a first magnitude and a first period and said negative portion has a second magnitude and a second period and where said first magnitude and said second magnitude are not the same; and
   adjusting a wave balance of said welding waveform to maintain said stable short welding arc, wherein said wave balance is a ratio between said first period and said waveform period, and
   wherein if an absolute value of said first magnitude is greater than an absolute value of said second magnitude then said wave balance is reduced to maintain said stable short welding arc and if said first magnitude absolute value is less than said second magnitude absolute value then said wave balance is increased to maintain said stable short welding arc.

2. The method of claim 1, further comprising using said welding waveform to melt a sheath and a core of said cored welding electrode at approximately the same rate.

3. The method of claim 1, further comprising independently controlling each of said positive portion and said negative portion of said welding waveform.

4. The method of claim 1, further comprising adjusting a difference between said first and second magnitude absolute values to maintain said stable short welding arc.

5. The method of claim 1, if the first magnitude absolute value is greater than the second magnitude absolute value said wave balance is maintained between 0.05 and 0.5.

6. The method of claim 1, if the first magnitude absolute value is greater than the second magnitude absolute value said wave balance is maintained between 0.05 and 0.15.

7. The method of claim 1, if the first magnitude absolute value is less than the second magnitude absolute value said wave balance is maintained between 0.3 and 0.95.

8. The method of claim 1, if the first magnitude absolute value is less than the second magnitude absolute value said wave balance is maintained between 0.85 and 0.95.

9. The method of claim 1, wherein said second magnitude absolute value is in the range of 0.7 to 0.9 of the first magnitude absolute value.

10. The method of claim 1, wherein said first period is in the range of 5 to 15% of the waveform period.

11. The method of claim 1, wherein the lesser of the first and second magnitude absolute values is 10 to 30% lesser than the greater of the first and second magnitude absolute values.

12. The method of claim 1, wherein said cored welding electrode has less than 10% aluminum in a core of the cored welding electrode.

13. The method of claim 1, wherein said cored welding electrode has less than 5% aluminum in a core of the cored welding electrode.

14. The method of claim 1, wherein said cored welding electrode has less than 2% aluminum in a core of the cored welding electrode.

15. The method of claim 1, wherein said cored welding electrode has less than substantially no aluminum in a core of the cored welding electrode.

16. The method of claim 1, wherein said welding waveform is a voltage waveform.

17. The method of claim 1, wherein said welding waveform is formed by a series of pulses controlled by a wave shape generator.

18. The method of claim 1, wherein a core of said cored welding electrode include particles of a compound to oxidize aluminum.

19. The method of claim 1, wherein a core of said cored welding electrode has a slag system with an end product slag comprising: a slag component selected from a class consisting of $TiO_2$, $Al_2O_3$, $Fe_2O_3$, $ZrO_2$ and combinations thereof and MgO.

20. The method of claim 1, wherein a core of said cored welding electrode has a slag system comprising: 5-35% of $TiO_2$, 5-35% of $ZrO_2$, 0-5% of $Na_2O$, 0-5% of $Li_2O$, and 15-45% of MgO.

21. The method of claim 1, wherein a core of said cored welding electrode has a slag system comprising: 10-35% of $Al_2O_3$, 10-40% of MgO, 5-20% of $Fe_2O_3$, 0-20% of $ZrO_2$, and 0-5% of $Li_2O$.

22. A method of arc welding with a cored welding electrode, said method comprising:
   generating a welding waveform with a waveform period and a root mean square (RMS) level based on at least said cored welding electrode, said welding waveform having a positive portion and a negative portion, wherein said positive portion has a first magnitude and a first period and said negative portion has a second magnitude and a second period and where said first magnitude and said second magnitude are not the same; and
   adjusting a wave balance of said welding waveform to maintain said RMS level below an arc stability level, wherein said wave balance is a ratio between said first period and said waveform period, and wherein if an absolute value of said first magnitude is greater than an absolute value of said second magnitude then said wave balance is reduced to maintain said RMS level below said arc stability level and if said first magnitude absolute value is less than said second magnitude absolute value then said wave balance is increased to maintain said RMS level below said arc stability level.

23. The method of claim 22, further comprising using said welding waveform to melt a sheath and a core of said cored welding electrode at approximately the same rate.

24. The method of claim 22, further comprising independently controlling each of said positive portion and said negative portion of said welding waveform.

25. The method of claim 22, further comprising adjusting a difference between said first and second magnitude absolute values to maintain said stable short welding arc.

26. The method of claim 22, if the first magnitude absolute value is greater than the second magnitude absolute value said wave balance is maintained between 0.05 and 0.5.

27. The method of claim 22, if the first magnitude absolute value is greater than the second magnitude absolute value said wave balance is maintained between 0.05 and 0.15.

28. The method of claim 22, if the first magnitude absolute value is less than the second magnitude absolute value said wave balance is maintained between 0.3 and 0.95.

29. The method of claim 22, if the first magnitude absolute value is less than the second magnitude absolute value said wave balance is maintained between 0.85 and 0.95.

30. The method of claim 22, wherein said second magnitude absolute value is in the range of 0.7 to 0.9 of the first magnitude absolute value.

31. The method of claim 22, wherein said first period is in the range of 5 to 15% of the waveform period.

32. The method of claim 22, wherein the lesser of the first and second magnitude absolute values is 10 to 30% lesser than the greater of the first and second magnitude absolute values.

33. The method of claim 22, wherein said cored welding electrode has less than 10% aluminum in a core of the cored welding electrode.

34. The method of claim 22, wherein said cored welding electrode has less than 5% aluminum in a core of the cored welding electrode.

35. The method of claim 22, wherein said cored welding electrode has less than 2% aluminum in a core of the cored welding electrode.

36. The method of claim 22, wherein said cored welding electrode has less than substantially no aluminum in a core of the cored welding electrode.

37. The method of claim 22, wherein said welding waveform is a voltage waveform.

38. The method of claim 22, wherein said welding waveform is formed by a series of pulses controlled by a wave shape generator.

39. The method of claim 22, wherein a core of said cored welding electrode include particles of a compound to oxidize aluminum.

40. The method of claim 22, wherein a core of said cored welding electrode has a slag system with an end product slag comprising: a slag component selected from a class consisting of $TiO_2$, $Al_2O_3$, $Fe_2O_3$, $ZrO_2$ and combinations thereof and MgO.

41. The method of claim 22, wherein a core of said cored welding electrode has a slag system comprising: 5-35% of $TiO_2$, 5-35% of $ZrO_2$, 0-5% of $Na_2O$, 0-5% of $Li_2O$, and 15-45% of MgO.

42. The method of claim 22, wherein a core of said cored welding electrode has a slag system comprising: 10-35% of $Al_2O_3$, 10-40% of MgO, 5-20% of $Fe_2O_3$, 0-20% of $ZrO_2$, and 0-5% of $Li_2O$.

43. A method of arc welding with a cored welding electrode, said method comprising:

generating a welding waveform to maintain a stable welding arc based on at least said cored welding electrode, said welding waveform having a waveform period, a positive portion and a negative portion, wherein said positive portion has a first magnitude and a first period and said negative portion has a second magnitude and a second period and where said first magnitude and said second magnitude are not the same; and adjusting a wave balance of said welding waveform to maintain said stable welding arc, wherein said wave balance is a ratio between said first period and said waveform period, and wherein if an absolute value of said first magnitude is greater than an absolute value of said second magnitude then said wave balance is reduced to maintain said stable welding arc and if said first magnitude absolute value is less than said second magnitude absolute value then said wave balance is increased to maintain said stable welding arc.

44. The method of claim 43, further comprising using said welding waveform to melt a sheath and a core of said cored welding electrode at approximately the same rate.

45. The method of claim 43, further comprising independently controlling each of said positive portion and said negative portion of said welding waveform.

46. The method of claim 43, further comprising adjusting a difference between said first and second magnitude absolute values to maintain said stable welding arc.

47. The method of claim 43, if the first magnitude absolute value is greater than the second magnitude absolute value said wave balance is maintained between 0.05 and 0.5.

48. The method of claim 43, if the first magnitude absolute value is greater than the second magnitude absolute value said wave balance is maintained between 0.05 and 0.15.

49. The method of claim 43, if the first magnitude absolute value is less than the second magnitude absolute value said wave balance is maintained between 0.3 and 0.95.

50. The method of claim 43, if the first magnitude absolute value is less than the second magnitude absolute value said wave balance is maintained between 0.85 and 0.95.

51. The method of claim 43, wherein said second magnitude absolute value is in the range of 0.7 to 0.9 of the first magnitude absolute value.

52. The method of claim 43, wherein said first period is in the range of 5 to 15% of the waveform period.

53. The method of claim 43, wherein the lesser of the first and second magnitude absolute values is 10 to 30% lesser than the greater of the first and second magnitude absolute values.

54. The method of claim 43, wherein said cored welding electrode has less than 10% aluminum in a core of the cored welding electrode.

55. The method of claim 43, wherein said cored welding electrode has less than 5% aluminum in a core of the cored welding electrode.

56. The method of claim 43, wherein said cored welding electrode has less than 2% aluminum in a core of the cored welding electrode.

57. The method of claim 43, wherein said cored welding electrode has less than substantially no aluminum in a core of the cored welding electrode.

58. The method of claim 43, wherein said welding waveform is a voltage waveform.

59. The method of claim 43, wherein said welding waveform is formed by a series of pulses controlled by a wave shape generator.

60. The method of claim 43, wherein a core of said cored welding electrode include particles of a compound to oxidize aluminum.

61. The method of claim 43, wherein a core of said cored welding electrode has a slag system with an end product slag comprising: a slag component selected from a class consisting of $TiO_2$, $Al_2O_3$, $Fe_2O_3$, $ZrO_2$ and combinations thereof and MgO.

62. The method of claim 43, wherein a core of said cored welding electrode has a slag system comprising: 5-35% of $TiO_2$, 5-35% of $ZrO_2$, 0-5% of $Na_2O$, 0-5% of $Li_2O$, and 15-45% of MgO.

63. The method of claim 43, wherein a core of said cored welding electrode has a slag system comprising: 10-35% of $Al_2O_3$, 10-40% of MgO, 5-20% of $Fe_2O_3$, 0-20% of $ZrO_2$, and 0-5% of $Li_2O$.

64. A method of arc welding with a cored welding electrode, said method comprising:
generating a welding waveform with a waveform period and a root mean square (RMS) level based on at least said cored welding electrode, said welding waveform having a positive portion and a negative portion, wherein said positive portion has a first magnitude and a first period and said negative portion has a second magnitude and a second period and where an absolute value of said first magnitude is greater than an absolute value of said second magnitude; and
adjusting a wave balance of said welding waveform to maintain said RMS level below an arc stability level, wherein said wave balance is a ratio between said first period and said waveform period, and
wherein said wave balance is maintained between 0.05 and 0.5.

65. The method of claim 64, further comprising using said welding waveform to melt a sheath and a core of said cored welding electrode at approximately the same rate.

66. The method of claim 64, further comprising independently controlling each of said positive portion and said negative portion of said welding waveform.

67. The method of claim 64, further comprising adjusting a difference between said first and second magnitude absolute values to maintain said stable welding arc.

68. The method of claim 64, if the first magnitude absolute value is greater than the second magnitude absolute value said wave balance is maintained between 0.05 and 0.15.

69. The method of claim 64, wherein said second magnitude absolute value is in the range of 0.7 to 0.9 of the first magnitude absolute value.

70. The method of claim 64, wherein said first period is in the range of 5 to 15% of the waveform period.

71. The method of claim 64, wherein the second magnitude absolute value is 10 to 30% lesser than the first magnitude absolute value.

72. The method of claim 64, wherein said cored welding electrode has less than 10% aluminum in a core of the cored welding electrode.

73. The method of claim 64, wherein said cored welding electrode has less than 5% aluminum in a core of the cored welding electrode.

74. The method of claim 64, wherein said cored welding electrode has less than 2% aluminum in a core of the cored welding electrode.

75. The method of claim 64, wherein said cored welding electrode has less than substantially no aluminum in a core of the cored welding electrode.

76. The method of claim 64, wherein said welding waveform is a voltage waveform.

77. The method of claim 64, wherein said welding waveform is formed by a series of pulses controlled by a wave shape generator.

78. The method of claim 64, wherein a core of said cored welding electrode include particles of a compound to oxidize aluminum.

79. The method of claim 64, wherein a core of said cored welding electrode has a slag system with an end product slag comprising: a slag component selected from a class consisting of $TiO_2$, $Al_2O_3$, $Fe_2O_3$, $ZrO_2$ and combinations thereof and MgO.

80. The method of claim 64, wherein a core of said cored welding electrode has a slag system comprising: 5-35% of $TiO_2$, 5-35% of $ZrO_2$, 0-5% of $Na_2O$, 0-5% of $Li_2O$, and 15-45% of MgO.

81. The method of claim 64, wherein a core of said cored welding electrode has a slag system comprising: 10-35% of $Al_2O_3$, 10-40% of MgO, 5-20% of $Fe_2O_3$, 0-20% of $ZrO_2$, and 0-5% of $Li_2O$.

82. A method of arc welding with a cored welding electrode, said method comprising:
generating a welding waveform with a waveform period and a root mean square (RMS) level based on at least said cored welding electrode, said welding waveform having a positive portion and a negative portion, wherein said positive portion has a first magnitude and a first period and said negative portion has a second magnitude and a second period and where said first magnitude and said second magnitude are not the same; and
adjusting a wave balance of said welding waveform and a difference between said first and second magnitudes to maintain said RMS level below an arc stability level, wherein said wave balance is a ratio between said first period and said waveform period, and
wherein if an absolute value of said first magnitude is greater than an absolute value of said second magnitude then said wave balance is reduced to maintain said RMS level below said arc stability level and if said first magnitude absolute value is less than said second magnitude absolute value then said wave balance is increased to maintain said RMS level below said arc stability level.

83. The method of claim 82, further comprising using said welding waveform to melt a sheath and a core of said cored welding electrode at approximately the same rate.

84. The method of claim 82, further comprising independently controlling each of said positive portion and said negative portion of said welding waveform.

85. The method of claim 82, if the first magnitude absolute value is greater than the second magnitude absolute value said wave balance is maintained between 0.05 and 0.5.

86. The method of claim 82, if the first magnitude absolute value is greater than the second magnitude absolute value said wave balance is maintained between 0.05 and 0.15.

87. The method of claim 82, if the first magnitude absolute value is less than the second magnitude absolute value said wave balance is maintained between 0.3 and 0.95.

88. The method of claim 82, if the first magnitude absolute value is less than the second magnitude absolute value said wave balance is maintained between 0.85 and 0.95.

89. The method of claim 82, wherein said second magnitude absolute value is in the range of 0.7 to 0.9 of the first magnitude absolute value.

90. The method of claim 82, wherein said first period is in the range of 5 to 15% of the waveform period.

91. The method of claim 82, wherein the lesser of the first and second magnitude absolute values is 10 to 30% lesser than the greater of the first and second magnitude absolute values.

92. The method of claim 82, wherein said cored welding electrode has less than 10% aluminum in a core of the cored welding electrode.

93. The method of claim 82, wherein said cored welding electrode has less than 5% aluminum in a core of the cored welding electrode.

94. The method of claim 82, wherein said cored welding electrode has less than 2% aluminum in a core of the cored welding electrode.

95. The method of claim 82, wherein said cored welding electrode has less than substantially no aluminum in a core of the cored welding electrode.

96. The method of claim 82, wherein said welding waveform is a voltage waveform.

97. The method of claim 82, wherein said welding waveform is formed by a series of pulses controlled by a wave shape generator.

98. The method of claim 82, wherein a core of said cored welding electrode include particles of a compound to oxidize aluminum.

99. The method of claim 82, wherein a core of said cored welding electrode has a slag system with an end product slag comprising: a slag component selected from a class consisting of $TiO_2$, $Al_2O_3$, $Fe_2O_3$, $ZrO_2$ and combinations thereof and MgO.

100. The method of claim 82, wherein a core of said cored welding electrode has a slag system comprising: 10-35% of $Al_2O_3$, 10-40% of MgO, 5-20% of $Fe_2O_3$, 0-20% of $ZrO_2$, and 0-5% of $Li_2O$.

101. The method of claim 82, wherein a core of said cored welding electrode has a slag system comprising: 5-35% of $TiO_2$, 5-35% of $ZrO_2$, 0-5% of $Na_2O$, 0-5% of $Li_2O$, and 15-45% of MgO.

102. A method of arc welding with a cored welding electrode, said method comprising:
generating a welding waveform with a waveform period and a root mean square (RMS) level based on at least said cored welding electrode, said welding waveform having a positive portion and a negative portion, wherein said positive portion has a first magnitude and a first period and said negative portion has a second magnitude and a second period and where said first magnitude and said second magnitude are not the same; and
adjusting a wave balance of said welding waveform to maintain said RMS level below an arc stability level, wherein said wave balance is a ratio between said first period and said waveform period, and
wherein if an absolute value of said first magnitude is greater than an absolute value of said second magnitude then said wave balance is reduced to maintain said RMS level below said arc stability level and if said first magnitude absolute value is less than said second magnitude absolute value then said wave balance is increased to maintain said RMS level below said arc stability level, and
wherein if the first magnitude absolute value is greater than the second magnitude absolute value said wave balance is maintained between 0.05 and 0.5, and if the first magnitude absolute value is less than the second magnitude absolute value said wave balance is maintained between 0.3 and 0.95.

103. A method of arc welding with a cored welding electrode, said method comprising:
generating a welding waveform with a waveform period and a root mean square (RMS) level based on at least said cored welding electrode, said welding waveform having a positive portion and a negative portion, wherein said positive portion has a first magnitude and a first period and said negative portion has a second magnitude and a second period and where said first magnitude and said second magnitude are not the same; and
adjusting a wave balance of said welding waveform to maintain said RMS level below an arc stability level, wherein said wave balance is a ratio between said first period and said waveform period, and
wherein if an absolute value of said first magnitude is greater than an absolute value of said second magnitude then said wave balance is reduced to maintain said RMS level below said arc stability level and if said first magnitude absolute value is less than said second magnitude absolute value then said wave balance is increased to maintain said RMS level below said arc stability level, and
wherein if the first magnitude absolute value is greater than the second magnitude absolute value said wave balance is maintained between 0.05 and 0.15, and if the first magnitude absolute value is less than the second magnitude absolute value said wave balance is maintained between 0.85 and 0.95.

* * * * *